US007467073B2

(12) United States Patent
Nasr et al.

(10) Patent No.: US 7,467,073 B2
(45) Date of Patent: Dec. 16, 2008

(54) METHOD AND SYSTEM FOR ASSESSING REMANUFACTURABILITY OF AN APPARATUS

(75) Inventors: Nabil Nasr, Pittsford, NY (US);
Timothy Bold, Lawrenceville, GA (US);
Jeffrey Heintz, Scottsville, NY (US);
Scott Nichols, Ontario, NY (US);
Gordon Scott Valentine, Pittsford, NY (US)

(73) Assignee: Rochester Institute of Technology, Rochester, NY (US)

( * ) Notice: Subject to any disclaimer, the term of this patent is extended or adjusted under 35 U.S.C. 154(b) by 748 days.

(21) Appl. No.: 09/825,218

(22) Filed: Apr. 3, 2001

(65) Prior Publication Data

US 2002/0023251 A1 Feb. 21, 2002

Related U.S. Application Data

(60) Provisional application No. 60/195,526, filed on Apr. 7, 2000.

(51) Int. Cl.
*G06G 7/48* (2006.01)
(52) U.S. Cl. .......................................... 703/6; 705/400
(58) Field of Classification Search ...................... 703/6; 705/400
See application file for complete search history.

(56) References Cited

U.S. PATENT DOCUMENTS

| 5,877,961 | A |   | 3/1999  | Moore        |        |
|-----------|---|---|---------|--------------|--------|
| 5,923,834 | A |   | 7/1999  | Thieret et al. |      |
| 6,052,631 | A | * | 4/2000  | Busch et al. | 701/29 |
| 6,151,565 | A | * | 11/2000 | Lobley et al. | 703/2 |
| 6,161,101 | A |   | 12/2000 | Guinta et al. |      |
| 6,397,992 | B1| * | 6/2002  | Patridge     | 192/15 |
| 6,581,045 | B1| * | 6/2003  | Watson       | 705/400|

OTHER PUBLICATIONS

Eckenrode, Robert T.; "Weighting multiple criteria", 1965, Management Science, vol. 12, No. 3.*
Onodera, Katsushige; "Effective Techniques of FMEA at Each Life-Cycle Stage", 1997, Proceedings of the Annual Reliability and Maintainability Symposium.*
MIL-STD-1629A, "Military Standard procedures for performing a failure mode, effects and criticality analysis", Nov. 24, 1980.*
Donald P. Gaver et al.; "Failure, repair and replacement analysis of a navy subsystem: a case study of a pump", 1998, Applied Stochastic Models and Data Analysis, vol. 13, pp. 369-376.*
Henry Livingston; "GEB1: diminishing Manufacturing Sources and Material Shortages (DMSMS) Management Practices", 2000, 2000 DMSMS Conference, pp. 1-11.*
John J. McCall; "Maintenance policies for stochastically failing equipment: a survey", Mar. 1965, Management Science, vol. 11, No. 5, pp. 493-524; p. 494, third paragraph, and p. 498, assessing a plurality of remanufacturing options for each item to identify which of a plurality of remanufacturing options are viable.*

* cited by examiner

*Primary Examiner*—Paul L Rodriguez
*Assistant Examiner*—Russ Guill
(74) *Attorney, Agent, or Firm*—Nixon Peabody LLP

(57) ABSTRACT

A system and method for assessing remanufacturability of one or more items in an apparatus includes assessing a plurality of remanufacturing options for an item based on a determination of the overall condition for the item, a determination on whether the item satisfies operation specifications, and a determination of a risk priority for the item to identify which of the plurality of remanufacturing options are viable.

103 Claims, 22 Drawing Sheets

DATA AVAILABILITY MATRIX

| System Hierarchy | Failure log | Manuals | System Map/Drawings | Function definition | OEM specs | Customer Specs | Technology upgrade | Condition Assessment | New Cost ($) | Data Missing (Count) | Percent of data |
|---|---|---|---|---|---|---|---|---|---|---|---|
| MECHANICAL | | | | | | | | | | 1017 | 52% |
| Propulsion | | | | | | | | | | 186 | 38% |
|   Drive MTU (port) | | | | | | | | | | | |
|     Mounting | x | x | x | ● | x | x | x | ● | A | | |
|     Remote control from the bridge | | | ● | ● | x | | | ● | A | | |
|     Enclosed operator space controls | | | ● | ● | x | | | ● | A | | |
|     Local controls | | | ● | ● | x | | | ● | A | | |
|     Exhaust | x | x | x | ● | x | | | ● | A | | |
|     Ignition | | | x | ● | | | | | A | | |
|     Air intake | | x | x | ● | x | | | ● | A | | |
|     Reduction gearing | | | x | ● | ● | | | ● | A | | |
|     Water seal | | x | ● | ● | | | | ● | A | | |
|     Drive shaft | | x | ● | ● | | | | ● | A | | |
|     Turbocharger | | | | ● | | | | ● | A | | |
|     Salt water cooling | | x | | ● | | | | ● | A | | |
|     Fuel oil system | | x | | ● | ● | | | ● | A | | |
|     Engine coolant pre-heater | ● | ● | ● | ● | ● | | | ● | A | | |
|     Drive MTU internal air compressor | | | | ● | | | | ● | A | | |
|     Hydraulics | | | | ● | | | | ● | A | | |
|     Engine block components | | x | | ● | | | | ● | A | | |
|   Drive MTU (starboard) | | | | | | | | | | | |
|     Mounting | x | x | x | ● | x | x | x | ● | A | | |
|     Remote control from the bridge | | | ● | ● | x | | | ● | A | | |
|     Enclosed operator space controls | | | ● | ● | x | | | ● | A | | |
|     Local controls | | | ● | ● | x | | | ● | A | | |
|     Exhaust | x | x | ● | ● | x | | | ● | A | | |
|     Ignition | | | x | ● | | | | | A | | |
|     Air intake | | x | x | ● | x | | | ● | A | | |
|     Reduction gearing | | | x | ● | ● | | | ● | A | | |
|     Water seal | | x | ● | ● | | | | ● | A | | |
|     Drive shaft | | x | ● | ● | | | | ● | A | | |
|     Turbocharger | | | | ● | | | | ● | A | | |
|     Salt water cooling | | x | | ● | | | | ● | A | | |
|     Fuel oil system | | x | | ● | ● | | | ● | A | | |
|     Engine coolant pre-heater | ● | ● | ● | ● | ● | | | ● | A | | |
|     Drive MTU internal air compressor | | | | ● | | | | ● | A | | |
|     Hydraulics | | | | ● | | | | ● | A | | |
|     Engine block components | | x | | ● | | | | ● | A | | |
|   KaMeWa jet (port) | | | | | | | | | | | |
|     Hydraulic powerpack | | | ● | ● | | | | ● | A | | |
|     Hydraulic lines | | x | ● | ● | | | | ● | A | | |
|     Electric heater | | x | x | ● | | | | ● | A | | |
|     Jet nozzle | | | ● | ● | ● | | | ● | A | | |
|     Jet pump | | | ● | ● | ● | | | ● | A | | |
|   KaMeWa jet (starboard) | | | | | | | | | | | |
|     Hydraulic powerpack | | | ● | ● | | | | ● | A | | |
|     Hydraulic lines | | x | ● | ● | | | | ● | A | | |

*FIG. 3*

FUNCTION MATRIX

| System | Subsystem | Element | Primary Function | Secondary function |
|---|---|---|---|---|
| MECHANICAL | | | | |
| Propulsor | Drive MTU (port) | Mounting | Deliver torque to port KaMeWa waterjet pump | |
| | | Remote control from the bridge | Secure engine to ship framing so prevent movement and vibration | |
| | | Enclosed operator space controls | Provide means to control engines from bridge for navigation purposes | |
| | | Local controls | Provide for centralized monitoring and control of engines | |
| | | Exhaust | Provide local control of engine functions | |
| | | Ignition | Expel combustion gases to exterior of ship | |
| | | Air intake | Provide means for engine start-up | |
| | | Reduction gearing | Transfer air to engine for combustion | |
| | | Water seal | Reduce RPMs to KMW jets to prevent cavitation | |
| | | Drive shaft | Provides seal between drive shaft and bulkhead | |
| | | Turbocharger | Transfer power from engine to KaMeWa waterjet pump (port) | |
| | | Salt water cooling | Boost engine power | |
| | | Fuel oil system | Provide cooling to engine, exhaust and reduction gearing | Interface with salt water cooling transfer system |
| | | Engine coolant pre-heater | Provide fuel oil to engine | Interface with fuel oil transfer system |
| | | Drive MTU internal air compressor | Heat engine coolant during extreme weather to prevent freezing | |
| | | Hydraulics | Provide compressed air for engine functions | Serve as auxiliary source to main L/P air system |
| | | Engine block components | Provide hydraulic pressure boost for KaMeWa hydraulic pack | Serve as auxiliary source to main hydraulic system |
| | Drive MTU (starboard) | Mounting | Convert chemical energy (fuel oil) to mechanical energy | |
| | | Remote control from the bridge | Deliver torque to starboard KaMeWa waterjet pump | |
| | | Enclosed operator space controls | Secure engine to ship framing to prevent movement and vibration | |
| | | Local controls | Provide means to control engine from bridge for navigation purposes | |
| | | Exhaust | Provide for centralized monitoring and control of engines | |
| | | Ignition | Provide local control of engine functions | |
| | | Air intake | Expel combustion gases to exterior of ship | |
| | | Reduction gearing | Provide means for engine start-up | |
| | | Water seal | Transfer air to engine for combustion | |
| | | Drive shaft | Reduce RPMs to KMW jets to prevent cavitation | |
| | | Turbocharger | Provides seal between drive shaft and bulkhead | |
| | | Salt water cooling | Transfer power from engine to KaMeWa waterjet pump (starboard) | |
| | | Fuel oil system | Boost engine power | |
| | | Engine coolant pre-heater | Provide cooling to engine, exhaust and reduction gearing | Interface with salt water cooling transfer system |
| | | Drive MTU internal air compressor | Provide fuel oil to engine | Interface with fuel oil transfer system |
| | | Hydraulics | Heat engine coolant during extreme weather to prevent freezing | |
| | | Engine block components | Provide compressed air for engine functions | Serve as auxiliary source to main L/P air system |
| | KaMeWa jet (port) | Hydraulic powerpack | Provide hydraulic pressure for engine functions | Serve as auxiliary source to main hydraulic system |
| | | Hydraulic lines | Convert chemical energy (fuel oil) to mechanical energy | |
| | | Electric heater | Convert torque supplied by port drive engine to propulsary force | |
| | | Jet nozzle | Provide hydraulic pressure for waterjet manipulation | Serve as auxiliary source to main hydraulic system |
| | | Jet pump | Transfer hydraulic pressure from powerpack to waterjet | |
| | KaMeWa jet (starboard) | Hydraulic powerpack | Maintain ambient temperature around jets | |
| | | Hydraulic lines | Provide means of directing waterflow for steering/reversing | |
| | | Electric heater | Output seawater under pressure for waterjet manipulation | |
| | | Jet nozzle | Convert torque supplied by stbd drive engine to propulsary force | Serve as auxiliary source to main hydraulic system |
| | | Jet pump | Provide hydraulic pressure for waterjet manipulation | |
| | | | Transfer hydraulic pressure from powerpack to waterjet | |
| | | | Maintain ambient temperature around jets | |
| | | | Provide means of directing waterflow for steering/reversing | |
| | | | Output seawater under pressure to provide propulsary forces | |

*FIG. 5*

CONDITION ASSESSMENT DATA SHEET

| ESWBS | |
|---|---|
| 23310 | |
| Function Group | |
| MECHANICAL | |
| System | |
| Propulsion | |
| Subsystem | |
| Drive MTU | |
| Item description | |
| Drive MTU port | |

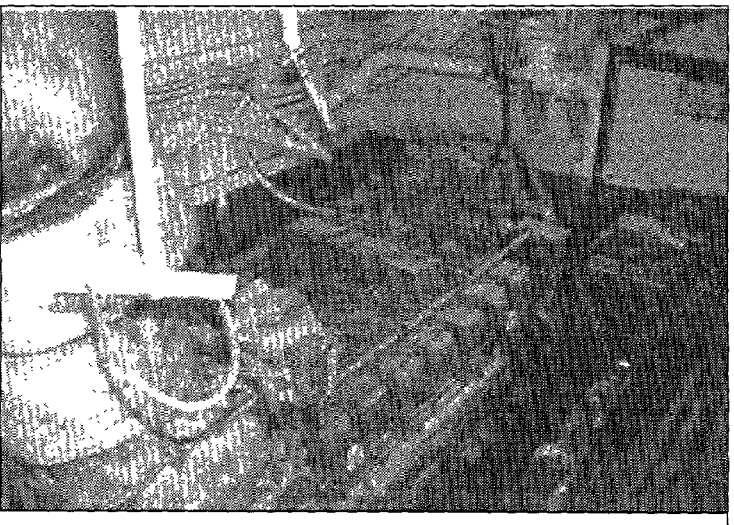

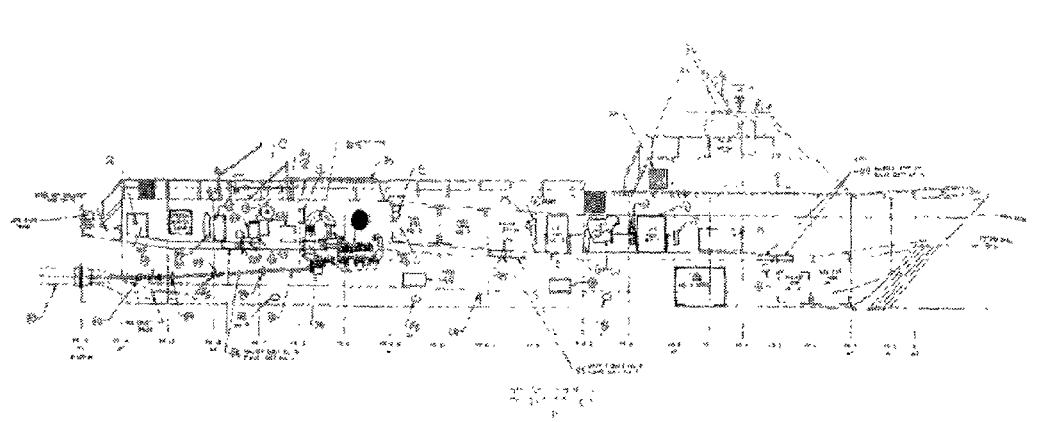

| Frame location: | Ship location: | | |
|---|---|---|---|
| 8-6 to 8-10 | (11) Port | | |
| Manufacturer: | Model #: | Part #: | Serial #: |
| Detroit Diesel | MTU 16V-396 TB94 | | 559-0477 |

Condition:
Mounting, Remote control from the bridge, Enclosed operator space controls, Local controls, Exhaust, Ignition, Air intake, Reduction gearing, Water seal, Drive shaft, Turbocharger, Salt water cooling, Fuel oil system, Engine coolant pre-heater, Aux drive MTU air compressor, Hydraulics, Engine block components, *Operating hours meter = 1930.68 hrs *Turbo rusted *Slight corrosion or other surface damage *Air intakes missing *Water buildup in drive shaft compartment *Coolant manifold severely cracked * Large coupling on drive shaft (FR 13) corroded *Wt. = 6685 kg *2560 kW *2150 RPM *Sea water cooling fitting to reduction gear cracked *See detailed report from Florida Detroit Diesel-MTU for more information

CONDITION ASSESSMENT MATRIX

| System Hierarchy | Physical Condition | | | | | | | | | | | Overall Condition | | |
|---|---|---|---|---|---|---|---|---|---|---|---|---|---|---|
| | Seized/ frozen | Corrosion Light | Corrosion Severe | Wear Excessive | Oil Leakage | Fuel Leakage | Water Seepage | Missing Parts | Dis- connected | Fractured/ Cracked | Ruptured | Poor | Fair | Good |
| MECHANICAL | | | | | | | | | | | | | | |
| Propulsion | | | | | | | | | | | | | | |
| Drive MTU (port) | | | | | | | | | | | | | | |
| Mounting | | | | | | | | | | | | | ● | ● |
| Remote control from the bridge | | | | | | | | | | | | | | ● |
| Enclosed operator space controls | | | | | | | | | | | | | | ● |
| Local controls | | | | | | | | | | | | | ● | |
| Exhaust | | | | | | | | | | ● | | | | ● |
| Ignition | | | | | | | | ● | ● | | | | | |
| Air intake | | | | | | | ● | | | | | ● | | |
| Reduction gearing | | ● | | | | | | | | | | | ● | |
| Water seal | | ● | | | | | | | | | | | ● | |
| Drive shaft | | ● | | | | | | | | | | | ● | |
| Turbocharger | | ● | | | | | | | | | | | ● | |
| Salt water cooling | | | | | | | | | | | | | ● | |
| Fuel oil system | | | | | | | | | | | | | ● | |
| Engine coolant pre-heater | | | ● | | | | | | | | | ● | | |
| Drive MTU internal air compressor | | | | | | | | ● | | | | ● | | |
| Hydraulics | | | | | | | | | | | | | ● | |
| Engine block components | | | | | | | | | | | | | ● | |
| Drive MTU (starboard) | | | | | | | | | | | | | | |
| Mounting | | | | | | | | | | | | | | ● |
| Remote control from the bridge | | | | | | | | | | | | | | ● |
| Enclosed operator space controls | | | | | | | | | | | | | | ● |
| Local controls | | | | | | | | | | | | | ● | |
| Exhaust | | | | | | | | | | ● ● | | | | |
| Ignition | | | | | | | | | | | | ● ● | | |
| Air intake | | | | | | ● | | | | | | | | |
| Reduction gearing | | ● | | | | | | | | | | | | |
| Water seal | | ● | | | | | | | | | | | ● ● | |
| Drive shaft | | ● | | | | | | | | | | | | ● |

OPERATION SPECIFICATION MATRIX

| System | Subsystem | Element | Operational Specification |
|---|---|---|---|
| MECHANICAL | | | |
| Propulsion | Drive MTU (port) | | MTU 16V396TB94, Liquid cooled Four-stroke diesel engine, Anti-clockwise direction of rotation. High Performance Rating Class 1DS- Fast Vessels. Certification w/classifiable power (0.909 x rated power) from all leading classification societies. Fuel Power Stop kW (mhp): 2580 (3482), Engine output 3280 bhp each. Speed RPM: 2150, Gearbox Model: BW 755 Free-standing, Transmission Ratio: 2.33 : 1, Bore/Stroke mm (in.): 165/185 (6.57/.3), Total Displacement L (in³): 63.4 (3866), Intake air temp. 25°C / Sea water temp. 25°C, 3.0% power reduction @ 45°C (air) / 32°C (water), 5695 kg weight |
| | | Mounting | Flanges and conical rubber elements |
| | | Remote control from the bridge | |
| | | Enclosed operator space controls | Sheet-steel housing w/resilient mounts |
| | | Local controls | Speed, Temperatures (coolant, raw water, charge air, exhaust before turbine), Pressure (lube, non-return valves, coolant & raw water lines), Fluid levels |
| | | Exhaust | Exhaust gas turbo-charging |
| | | Ignition | Electric starter |
| | | Air intake | Combustion air system- intake filter strainer w/attaching hardware |
| | | Reduction gearing | Valve gear and gear train. Behr BW755. Serial #219 (STRBD) #220 (PORT). Ratio 2.33 : 1 |

*FIG. 8*

FAILURE MODES, EFFECTS, AND CRITICALITY ANALYSIS (FMECA)

| System | Subsystem | Function | Failure Modes | Cause |
|---|---|---|---|---|
| Propulsion | | | | |
| | Drive MTU | Deliver torque to KaMeWa waterjet pump | | |
| | | Secure engine to ship framing to prevent movement and vibration | Mounting fails | Wear |
| | | | | Corrosion |
| | | | | Manufacturer's defect |
| | | Provide means to control engine from bridge for navigation purposes | Remote control from the bridge fails | Power Failure |
| | | | | Circuit Interruption |
| | | Provide for centralized monitoring and control of engines | Enclosed operator space controls fail | Power Failure |
| | | | | Circuit Interruption |
| | | Provide local control of engine functions | Local controls fail | Power Failure |
| | | | | Circuit Interruption |
| | | Expel combustion gases to exterior of ship | Exhaust fails | Obstruction |
| | | | | Faulty Seal |
| | | | | Damaged Piping |
| | | Provide means for engine start-up | Ignition fails | Air System Failure |
| | | | | Power Failure |
| | | | | Circuit Interruption |
| | | Transfer air to engine for combustion | Air intake fails | Obstruction |
| | | Reduce RPMs to KMW jets to prevent cavitation | Reduction gear fails | Wear |
| | | | | Corrosion |
| | | | | Insufficient Lubrication |
| | | | | Manufacturer's defect |
| | | Transfer power from engine to KaMeWa waterjet pump (port) | Drive shaft fails | Wear |
| | | | | Corrosion |
| | | | | Load |
| | | | | Manufacturer's defect |
| | | Provides seal between drive shaft and bulkhead | Water Seal leaks | Wear |
| | | | | Manufacturer's defect |
| | | Boost engine power | Turbocharger fails | Wear |
| | | | | Corrosion |
| | | | | Manufacturer's defect |
| | | Provide cooling to engine, exhaust and reduction gearing | Salt water cooling fails | Wear |
| | | | | Corrosion |
| | | | | Manufacturer's defect |
| | | Heat engine coolant during extreme weather to prevent freezing | Kim HotStart Engine Coolant Heater fails | Power Failure |
| | | | | Electrical grounding |

*FIG. 9A*

FAILURE MODES, EFFECTS, AND CRITICALITY ANALYSIS (FMECA)

| Local Effect | Secondary Effect | Ultimate Effect | Detection | Sev. | Freq. | RPN |
|---|---|---|---|---|---|---|
| Excessive engine vibration/movement | Engine failure/drive train damage | Compromised propulsion to ship | Audible | 7 | 3 | 21 |
| Excessive engine vibration/movement | Engine failure/drive train damage | Compromised propulsion to ship | Audible | 7 | 3 | 21 |
| Excessive engine vibration/movement | Engine failure/drive train damage | Compromised propulsion to ship | Audible | 7 | 2 | 14 |
| Loss of engine control from bridge | | Inability to remotely control engines | Operational Failure | 4 | 3 | 12 |
| Loss of engine control from bridge | | Inability to remotely control engines | Operational Failure | 4 | 5 | 20 |
| System fails to respond to controls from ECR | Loss of remote control of engine (from bridge) | Compromised propulsion to ship | Operational Failure | 6 | 3 | 18 |
| System fails to respond to controls from ECR | Loss of remote control of engine (from bridge) | Compromised propulsion to ship | Operational Failure | 6 | 3 | 18 |
| Total loss of engine control | Runaway engine | Catastrophic damage to engine/potential loss of life | Audible | 9 | 1 | 9 |
| Total loss of engine control | Runaway engine | Catastrophic damage to engine/potential loss of life | Audible | 9 | 1 | 9 |
| Excessive backpressure | Stall engine | Compromised propulsion to ship | Gaging | 6 | 1 | 6 |
| Exhaust blow-by | Air quality in ship compromised | Health hazard | Gaging/Visual | 9 | 4 | 36 |
| Exhaust blow-by | Air quality in ship compromised | Health hazard | Gaging/Visual | 9 | 4 | 36 |
| Engine will not start | | Compromised propulsion to ship | Operational Failure | 7 | 4 | 28 |
| Engine will not start | | Compromised propulsion to ship | Operational Failure | 7 | 4 | 28 |
| Engine will not start | | Compromised propulsion to ship | Operational Failure | 7 | 4 | 28 |
| Reduced airflow to engine | Improper combustion | Compromised propulsion to ship | Gaging | 4 | 2 | 8 |
| Gearbox/drive shaft damage | No power transmission to KaMeWa | Compromised propulsion to ship | Visual | 6 | 4 | 24 |
| Gearbox/drive shaft damage | No power transmission to KaMeWa | Compromised propulsion to ship | Visual | 6 | 4 | 24 |
| Gearbox/drive shaft damage | No power transmission to KaMeWa | Compromised propulsion to ship | Visual | 6 | 5 | 30 |
| Gearbox/drive shaft damage | No power transmission to KaMeWa | Compromised propulsion to ship | Visual | 6 | 2 | 12 |
| Bent/broken drive shaft | No power transmission to KaMeWa | Compromised propulsion to ship | Visual | 6 | 4 | 24 |
| Bent/broken drive shaft | No power transmission to KaMeWa | Compromised propulsion to ship | Visual | 6 | 4 | 24 |
| Bent/broken drive shaft | No power transmission to KaMeWa | Compromised propulsion to ship | Visual | 6 | 5 | 30 |
| Bent/broken drive shaft | No power transmission to KaMeWa | Compromised propulsion to ship | Visual | 6 | 2 | 12 |
| Seawater leakage | Ship's trim affected | Below deck water/flooding | Visual | 7 | 4 | 28 |
| Seawater leakage | Ship's trim affected | Below deck water/flooding | Visual | 7 | 2 | 14 |
| No boost | Decreased engine output | Reduction in engine efficiency | Gaging | 3 | 4 | 12 |
| No boost | Decreased engine output | Reduction in engine efficiency | Gaging | 3 | 5 | 15 |
| No boost | Decreased engine output | Reduction in engine efficiency | Gaging | 3 | 2 | 6 |
| Engine/Gearbox/Exhaust Overheats | Engine failure | Compromised propulsion to ship | Gaging | 6 | 2 | 12 |
| Engine/Gearbox/Exhaust Overheats | Engine failure | Compromised propulsion to ship | Gaging | 6 | 3 | 18 |
| Engine/Gearbox/Exhaust Overheats | Engine failure | Compromised propulsion to ship | Gaging | 6 | 2 | 12 |
| Inability to preheat coolant at start-up | Potential thermal stressing | Engine failure/thermal cracking of engine block | Gaging | 7 | 3 | 21 |
| Inability to preheat coolant at start-up | Potential thermal stressing | Engine failure/thermal cracking of engine block | Gaging | 7 | 3 | 21 |

*FIG. 9B*

REMANUFACTURING OPTIONS CRITERIA

FIG. 10

REMANUFACTURING OPTIONS MATRIX

Legend:
- Identifies option as a "best" possible choice in the remanufacturing process ▪ (dark gray)
- Identifies option as a possible choice in the remanufacturing process ☐
- Identifies option as not feasible in the remanufacturing process ▪ (black)

| System | Sub-system | Element | Modify | Restore | Reuse | Replace | Remove |
|---|---|---|---|---|---|---|---|
| Propulsion | | | | | | | |
| | Drive MTU (port) | | | | | | |
| | | Mounting | | | | | |
| | | Remote control from the bridge | | | | | |
| | | Enclosed operator space controls | | | | | |
| | | Local controls | | | | | |
| | | Exhaust | | | | | |
| | | Ignition | | | | | |
| | | Air intake | | | | | |
| | | Reduction gearing | | | | | |
| | | Water seal | | | | | |
| | | Drive shaft | | | | | |
| | | Turbocharger | | | | | |
| | | Salt water cooling | | | | | |
| | | Fuel oil system | | | | | |
| | | Engine coolant pre-heater | | | | | |
| | | Drive MTU internal air compressor | | | | | |
| | | Hydraulics | | | | | |
| | | Engine block components | | | | | |
| | Drive MTU (starboard) | | | | | | |
| | | Mounting | | | | | |
| | | Remote control from the bridge | | | | | |
| | | Enclosed operator space controls | | | | | |
| | | Local controls | | | | | |
| | | Exhaust | | | | | |
| | | Ignition | | | | | |

COST AVAILABILITY MATRIX

- × = DATA NOT REQUIRED
- ● = DATA COLLECTED
- = NEED MORE INFORMATION TO PROCEED
- = ABLE TO LOOK FOR REMAN COSTS
- = IN THE PROCESS OF GETTING COST INFORMATION
- = NEED THE REMOVAL COST
- = DONE

| System Hierarchy | New-Replace | Clean-Reuse | Rework-Restore | Revise-Modify | Remove | Status | Main Contact | Data Missing (count) | Percent of data |
|---|---|---|---|---|---|---|---|---|---|
| High Value | | | | | | | | 25 | 52% |
| Drive MTU Engines (2) | ● | × | ● | × | × | Done | SGV | | |
| Reduction gearing (2) | ● | ● | ● | × | × | Done | SGV | | |
| Lift Engine Exhaust/Operator Space Controls | | | | | | Need Removal Cost | | | |
| KaMeWa Waterjets (2) | ● | × | × | × | × | Getting other costs | SGV | | |
| MTU Lift Engines (2) | ● | ● | × | × | × | Done | SGV | | |
| Firemain Pumps (2) | ● | ● | ● | × | ● | Done | CJP | | |
| Halon System | ● | × | × | × | ● | Done | CJP | | |
| Tanks (Fuel-Oil -4, Ballast -6, Lube -1) | × | | × | | × | Waiting on James Brown | SGV | | |
| KaMeWa Hydraulic Powerpacks (2) | ● | × | × | × | × | Getting other costs | SGV | | |
| L.P. Air Compressors port | ● | ● | ● | × | × | Done | AJM | | |
| L.P. Air Compressors starboard | ● | ● | ● | × | × | Done | AJM | | |
| Seachests (6) | × | × | × | × | × | Waiting on Frank | SGV | | |
| Ship Service Diesel Generators (2) | ● | ● | ● | × | × | Done | SGV | | |
| Electrical Wiring | × | ● | × | × | × | Waiting on Frank | SGV | | |
| Switchboard Generator Control Panel | × | × | × | × | × | Waiting on Frank | SGV | | |
| Hull (Shell Plating, Stringers, Frames, Outlets) - drydock,clean,paint,etc. | × | × | × | × | × | Waiting on Frank | SGV | | |
| Weather Deck | × | × | × | × | × | Waiting on Frank | SGV | | |
| Water Tight Doors (WTD's) | × | × | × | × | × | Waiting for Fax | SGV | | |
| Heads (latrines -4, sinks, piping, etc.) | | | ● | | × | Done | SGV | | |

| Option | Recovery | Economic | Notes | Ref |
|---|---|---|---|---|
| Modify | Impractical | Impractical | | |
| Remove | Impractical | Impractical | | |
| Replace | Possible | Possible | | |
| Restore | Best | Best | | 1 |
| Reuse | Impractical | Impractical | | 2 |

FIG. 14B

| Option | Recovery | Economic | Notes | Ref |
|---|---|---|---|---|
| Modify | Impractical | Impractical | | |
| Remove | Impractical | Impractical | | |
| Replace | Best | Best | | 226 |
| Restore | Possible | Possible | Dependent on recovery option for main drive MTU | 270 |
| Reuse | Impractical | Impractical | | |

FIG. 14C

| | | | |
|---|---|---|---|
| Scenario #1: | REPLACE *MTU* engine | REQUIRES | REPLACE *Kim Hotstart* w/ internal unit |
| Scenario #2: | RESTORE *MTU* engine | | REPLACE *Kim Hotstart* w/ new unit |
| Scenario #3: | RESTORE *MTU* engine | | RESTORE *Kim Hotstart* |

FIG. 15

PAIRED COMPARISON MATRIX
DETERMINING WEIGHTS FOR VALUE ANALYSIS

FIG. 16

PAIRED COMPARISON MATRIX
DETERMINING WEIGHTS FOR VALUE ANALYSIS

| Replace Reman Option | % (Weight) | Ratings |
|---|---|---|
| Cost (A) | 20% | 4 |
| Life Expectancy (B) | 33% | 4 |
| Improved Performance (C) | 27% | 4 |
| Operation Cost (Consumables) (D) | 13% | 3 |
| Maintenance Cost (E) | 7% | 4 |
| Additional Env. Performance (F) | 0% | 3 |

*FIG. 17A*

| Restore Reman Option | % (Weight) | Ratings |
|---|---|---|
| Cost (A) | 20% | 3 |
| Life Expectancy (B) | 33% | 4 |
| Improved Performance (C) | 27% | 3 |
| Operation Cost (Consumables) (D) | 13% | 3 |
| Maintenance Cost (E) | 7% | 4 |
| Additional Env. Performance (F) | 0% | 3 |

*FIG. 17B*

| Replace Reman Option | % (Weight) | Ratings | Score |
|---|---|---|---|
| Cost (A) | 20% | 4 | 0.80 |
| Life Expectancy (B) | 33% | 4 | 1.33 |
| Improved Performance (C) | 27% | 4 | 1.07 |
| Operation Cost (Consumables) (D) | 13% | 3 | 0.40 |
| Maintenance Cost (E) | 7% | 4 | 0.27 |
| Additional Env. Performance (F) | 0% | 3 | 0.00 |
| | | TOTAL | 3.87 |

*FIG. 18A*

| Restore Reman Option | % (Weight) | Ratings | Score |
|---|---|---|---|
| Cost (A) | 20% | 3 | 0.60 |
| Life Expectancy (B) | 33% | 4 | 1.33 |
| Improved Performance (C) | 27% | 3 | 0.80 |
| Operation Cost (Consumables) (D) | 13% | 3 | 0.40 |
| Maintenance Cost (E) | 7% | 4 | 0.27 |
| Additional Env. Performance (F) | 0% | 3 | 0.00 |
| | | TOTAL | 3.87 |

*FIG. 18B*

Paired Comparison Matrix
Determining Weights for Value Analysis – Main MTU Engine/Kim Hotstart Scenario

| Decision | | | | | | Total | % (Weight) |
|---|---|---|---|---|---|---|---|
| Cost (A) | B | C | A | A | A | 3 | 20% |
| Life Expectancy (B) | | B | B | B | B | 5 | 33% |
| Improved Performance (C) | | | C | C | C | 4 | 27% |
| Operation Cost (Consumables) (D) | | | | D | D | 2 | 13% |
| Maintenance Cost (E) | | | | | E | 1 | 7% |
| Additional Env. Performance (F) | | | | | | 0 | 0% |
| | | | | | Total | 15 | 100% |

| Scenario #1 | % (Weight) | Ratings | Score |
|---|---|---|---|
| Cost (A) | 20% | 3 | 0.60 |
| Life Expectancy (B) | 33% | 5 | 1.67 |
| Improved Performance (C) | 27% | 4 | 1.07 |
| Operation Cost (Consumables) (D) | 13% | 4 | 0.53 |
| Maintenance Cost (E) | 7% | 3 | 0.20 |
| Additional Env. Performance (F) | 0% | 4 | 0.00 |
| | | Total | 4.07 |

FIG. 20B

| Scenario #2 | % (Weight) | Ratings | Score |
|---|---|---|---|
| Cost (A) | 20% | 4 | 0.80 |
| Life Expectancy (B) | 33% | 4 | 1.33 |
| Improved Performance (C) | 27% | 3 | 0.80 |
| Operation Cost (Consumables) (D) | 13% | 3 | 0.40 |
| Maintenance Cost (E) | 7% | 3 | 0.20 |
| Additional Env. Performance (F) | 0% | 3 | 0.00 |
| | | Total | 3.53 |

FIG. 20C

| Scenario #3 | % (Weight) | Ratings | Score |
|---|---|---|---|
| Cost (A) | 20% | 4 | 0.80 |
| Life Expectancy (B) | 33% | 4 | 1.33 |
| Improved Performance (C) | 27% | 3 | 0.80 |
| Operation Cost (Consumables) (D) | 13% | 3 | 0.40 |
| Maintenance Cost (E) | 7% | 3 | 0.20 |
| Additional Env. Performance (F) | 0% | 3 | 0.00 |
| | | Total | 3.53 |

METHOD AND SYSTEM FOR ASSESSING REMANUFACTURABILITY OF AN APPARATUS

This application claims the benefit of U.S. Provisional Patent Application Ser. No. 60/195,526 filed on Apr. 7, 2000 which is herein incorporated by reference.

This invention was developed with government funding under Office of Navel Research Grant No. 30130. The U.S. Government may have certain rights.

FIELD OF THE INVENTION

The invention relates to a method and system for assessing remanufacturability of an apparatus.

BACKGROUND OF THE INVENTION

Historically, the primary concentration for the ship building industry has been on the construction of new shipping vessels. Unfortunately, the orders for new shipping vessels has been on the decline over the last ten years and at best level orders are expected for the foreseeable future. Accordingly, builders in the shipbuilding industry must enter and compete in other the markets to survive.

One of these markets is in the repair and/or conversion of existing ships. In this market, ship builders are competing for work on remanufacturing ships that have deteriorated and/or broken down from a variety of different factors, such as age, use, misuse, corrosion, etc. To make a bid for remanufacturing ship, the ship builders must determine what is the most viable option for remanufacturing.

Unfortunately, the typical analysis being performed on what is the most viable option for remanufacturable is often crude and/or inaccurate. As a result, the most viable remanufacturing option based on this analysis may not be suggested and/or implemented.

With the typical analysis, the estimated cost as well as the estimated amount of time required to remanufacture the ship is often off. A ship builder relying on one of this prior analysis technique risks bidding to low and/or setting a schedule which can not be met.

Additionally, the typical analysis often fails to take into account the risk priority of different portions of the ship when evaluating the various remanufacturing options. In other words, a particular remanufacturing option may appear to be the most desirable because it is the most cost effective, but because of the criticality of that particular portion of the ship being remanufactured a more expensive and/or time consuming remanufacturing option which is more reliable may have been more desirable.

Further, the typical analysis being performed often fails to take into account the possibility of technology upgrades for some or all portions of the ship. As a result, the most viable remanufacturing option might be one involving the use of a technology upgrade which was never considered.

SUMMARY OF THE INVENTION

A method for assessing remanufacturability of one or more items in an apparatus in accordance with one embodiment of the present invention comprises a few steps. An overall condition of each of the items is determined based on obtained data. A determination is made whether each of the items satisfies one or more operation specifications based on the obtained data. A determination of risk priority of each of the items is based on the obtained data. A plurality of remanufacturing options for each of the items are assessed based on the determined overall condition, the determined satisfaction, and the determined risk priority for each of the items to identify which of the plurality of remanufacturing options are viable.

The present invention provides an accurate and easy to use method and system for assessing the viability of a variety of remanufacturing options for an apparatus, such as a ship, vehicle, airplane, engine, copier, or other machine or system. An assessment for remanufacturability using the present invention has a higher degree of accuracy and/or reliability than prior assessment techniques.

One of the features of the present invention is that it provides a more accurate cost estimate for the remanufacturing options than previously was possible. As a result, manufacturers and others can have greater confidence in the assessment when trying to determine the total cost or to make a bid for a project.

Another feature of the present invention is that it can analyze the risk priority of systems, subsystems, and/or components within the apparatus when assessing various remanufacturing options. As a result, an apparatus remanufactured based on the assessment in accordance with the present invention will be designed to take into account factors relating to risk priority, such as the potential for failure and effect of a failure of systems, subsystems, and/or components within the apparatus. The assessment for remanufacturability should have greater reliability and/or better performance because of this risk priority analysis.

Further, another feature of the present invention is that it can identify and analyze the possibility of using technology upgrades for one or more systems, subsystems, and/or components within the apparatus when assessing various remanufacturing options. As a result, the remanufactured performance can take advantage of advances in technology and other upgrades which have come about since the original manufacture of the apparatus. The remanufactured apparatus is expected to have improved performance and/or reliability.

The present invention provides a process to analyze an apparatus' remanufacturability, that uses a consistent set of metrics that may be applied evenly across all systems and/or subsystems. The present invention provides decision-related information from pricing, design drawings, contacts, and regulations that are critical in deriving the correct remanufacturability options.

BRIEF DESCRIPTION OF THE DRAWINGS

FIG. 3 is a screen shot of a data availability matrix for a portion of the systems, subsystems, and components in the apparatus;

FIG. 5 is a screen shot of a function matrix for a portion of the systems, subsystems, and components in the apparatus;

FIG. 6 is a screen shot a condition assessment data sheet for one of the components of the apparatus;

FIG. 7 is a screen shot a condition assessment matrix for a portion of the systems, subsystems, and components in the apparatus;

FIG. 8 is a screen shot of an operation specification matrix for a portion of the systems, subsystems, and components in the apparatus;

FIG. 9A is a screen shot of one portion of a failure modes, effects, and criticality matrix for a portion of the systems, subsystems, and components in the apparatus;

FIG. 9B is a screen shot of the other portion of the failure modes, effects, and criticality matrix for a portion of the systems, subsystems, and components in the apparatus;

FIG. 10 is a screen shot of remanufacturing options criteria for assessing a portion of the systems, subsystems, and components in the apparatus;

FIG. 11 is a remanufacturing options matrix for assessing a portion of the systems, subsystems, and components in the apparatus;

FIG. 12 is a screen shot of a conversion project information base for a system in the apparatus;

FIG. 13 is a screen shot of a cost availability matrix for a portion of the systems, subsystems, and components in the apparatus;

FIG. 14A is a screen shot of an assessment of remanufacturing options for a system in the apparatus;

FIG. 14B is a screen shot of a reassessment of remanufacturing options for a system in the apparatus;

FIG. 14C is a screen shot of three scenarios for remanufacturing options for systems in the apparatus;

FIG. 15 is a screen shot of a paired comparison matrix for a value analysis;

FIG. 16 is a screen shot of a paired comparison matrix for a value analysis of a system in the apparatus;

FIG. 17A is a screen shot of ratings for a replace option for a value analysis;

FIG. 17B is a screen shot of ratings for a restore option for a value analysis;

FIG. 18A is a screen shot of scores for a replace option for a value analysis;

FIG. 18B is a screen shot of scores for a restore option for a value analysis;

FIG. 19 is a screen shot of a paired comparison matrix for a value analysis of another system in the apparatus;

FIGS. 20A-20C are screen shots of ratings and scores for three scenarios for remanufacturing options for a system in the apparatus;

DETAILED DESCRIPTION

Figure 1:
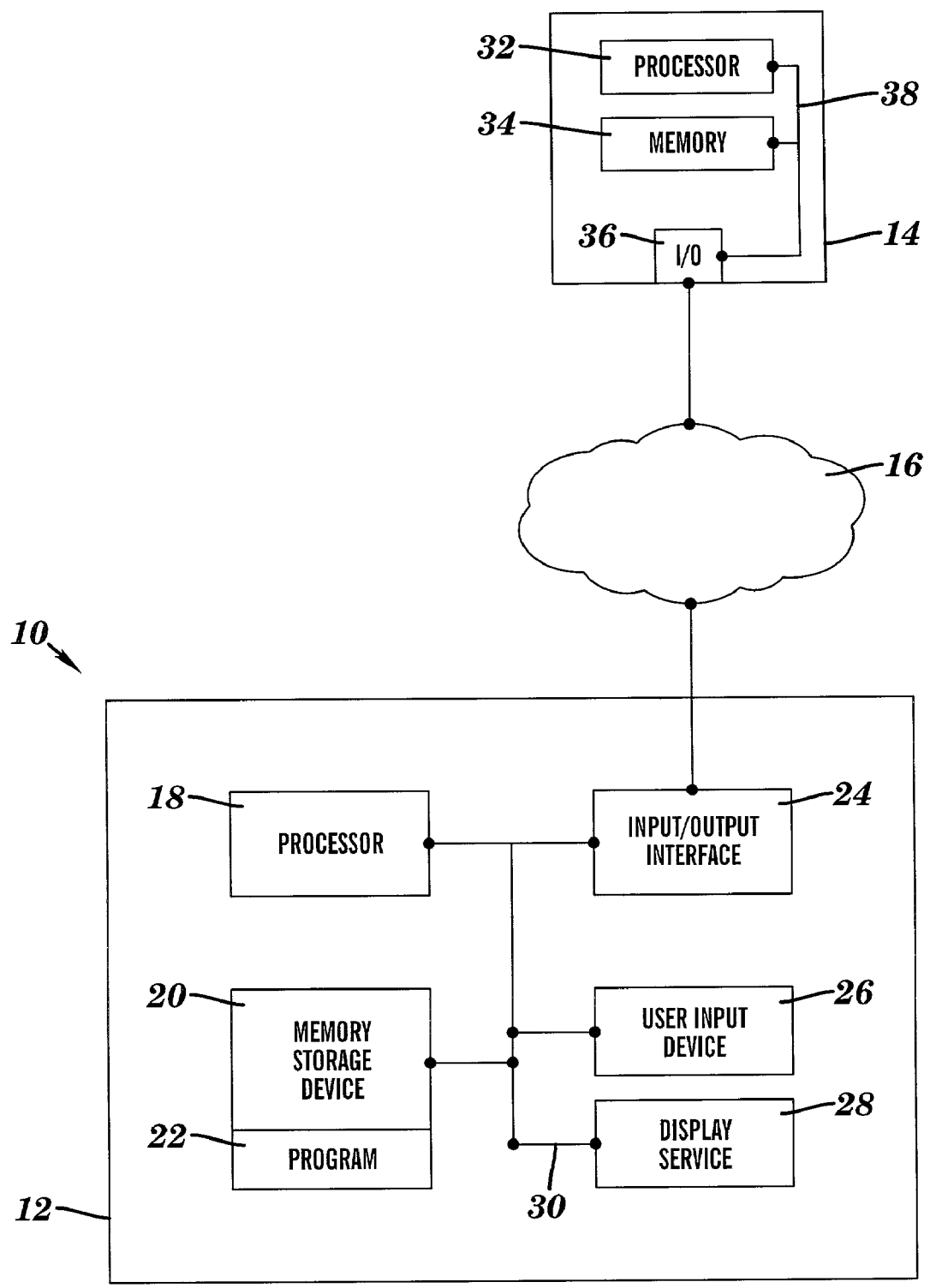
FIG. 1 is a block diagram of a system for assessing remanufacturability of an apparatus in accordance with one embodiment of the present invention.
Figure 2:
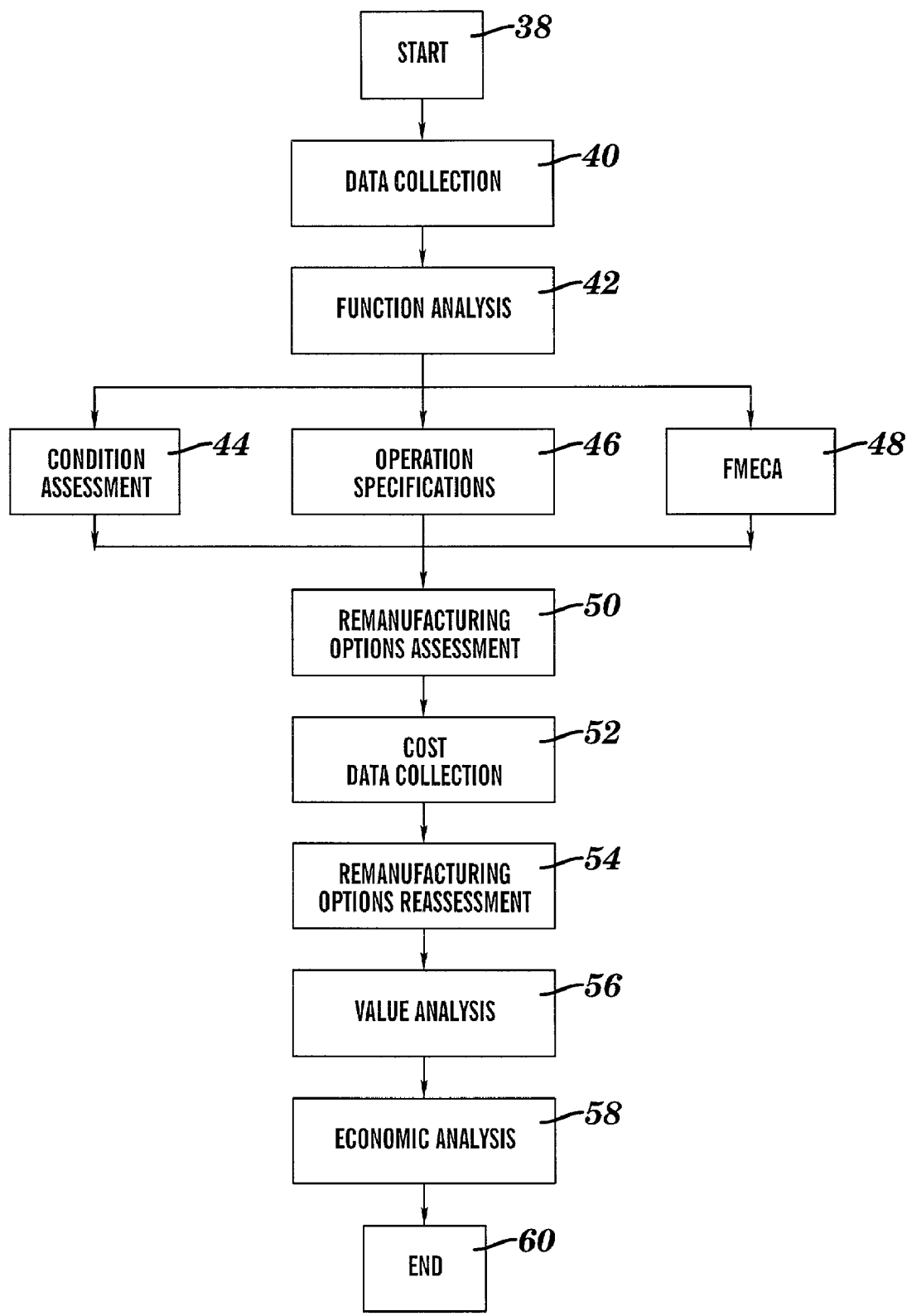
FIG. 2 is a flow chart of a method for assessing remanufacturability of an apparatus in accordance with one embodiment of the present invention.

A system 10 and method for assessing remanufacturability of an apparatus in accordance with one embodiment of the present invention is illustrated in FIGS. 1 and 2. The system 10 in accordance with one embodiment includes a remanufacturing processing system 12 and a method in accordance with one embodiment includes assessing a plurality of remanufacturing options for each of the components based on a determined overall condition of items, such as systems, subsystems, and/or components in the apparatus, a determined satisfaction of operation specifications of each of the items, and the determined risk priority for each of the items to identify which of the plurality of remanufacturing options are viable and which are not feasible. Among other features, the present invention provides an accurate and easy to use method and system for assessing the viability of a variety of remanufacturing options for an apparatus. By way of example only, the present invention will be discussed with reference to the assessment of the remanufacturability of a ship, although the present invention can be used to assess the remanufacturability of a variety of different types of apparatuses, such as a ship, vehicle, airplane, engine, copier, or other machine or system. Additionally, for purposes of discussion herein, an item means a component, subsystem, or system.

Referring to FIG. 1, in this particular embodiment the system 10 includes the remanufacturing processing system 12 and an optional component information system 14, although system 10 may have other components, other numbers of the components, and other combinations of the components. Additionally, in this particular embodiment the remanufacturing processing system 12 is operatively coupled to the component information system 14 via the internet 16, although a variety of communication systems and/or methods can be used to operatively couple and communicate between the remanufacturing processing system 12 and the component information system 14, such as a direct connection, a local area network, a wide area network, modems and phone lines, or wireless communication technology each having communications protocols. Although one configuration for the system 10 is shown, other configurations are possible and envisioned.

Remanufacturing processing system 12 includes at least one processor 18, at least one memory 20, at least one input/output interface 24, a user input device 26, and a display device 28 which are coupled together by a bus system 30 or other link, although the remanufacturing processing system 12 may comprise other components, other numbers of the components, and other combinations of the components. In this particular embodiment, the processor 18 executes a program 22 of stored instructions in memory storage device 20 for at least a portion of the method for assessing remanufacturability of an apparatus in accordance with one embodiment of the present invention as described herein and set forth in FIGS. 2-23, although the method in accordance with the present invention can be carried out in a variety of other manners. A variety of different types of devices can be used for memory storage device 20 to store the programmed instructions described herein as well as other information, such as a random access memory (RAM) or a read only memory (ROM) in the system or a floppy disk, hard disk, CD ROM, or other computer readable medium which is read from and/or written to by a magnetic, optical, or other reading and/or writing system that is coupled to the processor 18. Although in this particular embodiment, the method in accordance with one embodiment of the invention is stored as programmed instructions in the remanufacturing processing system 12 for execution by the processor 18, some or all of the programmed instructions could be stored and executed elsewhere. The input/output interface 20 is used to operatively couple and communicate between the remanufacturing processing system 12 and the component information system 14. The user input device 23 enables an operator to generate and transmit signals or commands to the processor 18, such as inputting data or requests for data about components. A variety of different types of user input devices can be used, such as a keyboard or computer mouse. The display device 28 enables the operator to observe displayed data information, such as the screen shots in FIGS. 3-11. A variety of different types of display devices can be used, such as a CRT or a printer.

In this particular embodiment, component information system 14 includes a processor 32, a memory 34, and an input/output interface 36 which are coupled together by a bus system 38 or other link, although the component information 14 may comprise other components, other numbers of the components, and other combinations of the components. Although in this particular embodiment, one component information system 14 is shown, the remanufacturing processing system may interact and communicate with no other systems or with multiple numbers of other systems. Additionally, component information system 14 can comprise a variety of different types of systems, such as simply a storage device for data about a component, subsystem and/or system in the apparatus or a processing system at a manufacturer for a component, subsystem and/or system with data about the component, such as the cost or operation specifications for the component, subsystem and/or system.

Referring to FIG. 2, the operation of a method for assessing remanufacturability of an apparatus in accordance with one embodiment of the present invention will be described. In step 38, this method starts.

Next in step 40, the remanufacturing processing system 12 obtains data on components, subsystems, and/or systems of the apparatus to obtain for the assessment. In this particular embodiment, the types of data on the components, subsystems, and/or systems of the apparatus needed for the assessment and possible sources for this data are identified. This identification is based on the particular type of apparatus being assessed and can be obtained from a variety of sources, such as from data stored in memory storage device 20 about the apparatus, from a data stored in another memory 34, or input by an operator using a user input device 26.

Next in this particular embodiment, once the types and possible sources of data on components, subsystems, and/or systems of the apparatus are identified, the remanufacturing processing system 12 obtains this data in a variety of different manners. At least a portion of the data may be obtained from existing data stored in memory storage device 20. By way of example only, during the use of each component, subsystem, and/or system in the apparatus data may be generated and a portion of this data may be stored in memory, such as in memory storage device 20. This data can be retrieved by remanufacturing processing system 12 for the assessment.

At least a portion of the data may also be obtained by researching for data on components, subsystems, and/or systems of the apparatus from other sources. By way of example only, data generated during the original manufacture of a component, subsystem, and/or system in the apparatus might be located and stored at another server, such as information component system 14. Remanufacturing processing system 12 can access and retrieve this data from information component system 14 via the Internet 16 or in other manners.

At least a portion of the data may also be obtained from on site evaluations of the components subsystems, and/or systems of the apparatus. Typically, this data is input into the remanufacturing processing system 12 using user input device 26, although other manners of inputting the data could be used. Since the data collected from on site assessments is often the most accurate source of data, this data can be given additional weight in the assessment process if desired for the particular application. The collection of data from on-site assessment also tends to be the most time consuming and costly source of data to obtain.

For illustrative purposes only, the process for obtaining data for a ship known as the SES-200 is discussed below. In this particular example, research about the ship was conducted using the Internet, technical libraries and videotape provided by Pacific Marine to identify the types of data needed. Additionally, a preliminary on-site visit to the ship was done to provide an initial understanding of the data needed for the assessment of the ship and to identify existing sources of data. Sources of identified data included existing engineering data at the Office of Naval Research, Pacific Marine and Maritime Dynamics.

Next, the identified data needed for the assessment of the ship was obtained. The existing and researched data obtained included design drawings, operation manuals, engineering CAD files and center of gravity calculations of the latest ship conversion from Maritime Dynamics, Inc. The research effort also resulted in the compilation of articles and pictures of the ship obtained from the Internet and other library sources. A video that provided historical information on technology on the ship was obtained from Pacific Marine. The obtained existing and researched data described above was retrieved by or entered into the remanufacturing processing system 12.

Data from on-site assessments of the ship was also obtained and recorded in a data availability matrix in the remanufacturing processing system 12. This on-site assessment data included data on the current condition of components, subsystems, and systems. In order to support the on-site data collection efforts in this example, a wide array of tools were assembled and used including data collection workbooks, portable computers, digital video equipment, visual inspection equipment, materials testing equipment, hand tools and task lighting to obtain the data which was input into the remanufacturing processing system 12. The type and content of the existing, researched and on-site data obtained and used in this example is explained in greater detail below.

In this particular embodiment, spreadsheets were made and completed to outline the content of the obtained data, and a numbering system was developed to aid document tracking in the remanufacturing processing system 12. The obtained data was recorded in a data availability matrix in the remanufacturing processing system 12. One example of a screen shot of a portion of the data availability matrix on display device 28 in the remanufacturing processing system 12 is illustrated in FIG. 3. The data availability matrix simplified the identification of missing data in the data set and was helpful in redirecting the data collection efforts. The data availability matrix breaks down each function group and shows what data type is available for each. In this particular example, the data types listed are failure logs, manuals, system maps/drawings, function definition, OEM specifications, customer specifications, technology upgrade, condition assessment and new cost, although the data types can vary based on the particular application.

Referring back to FIG. 2, in step 42 a function analysis to identify what systems and subsystems exist, what components are contained in those systems and subsystems and to create and describe the functional hierarchy and interrelations of the systems, subsystems, and/or components in the apparatus being assessed for remanufacturability is conducted. The level of detail necessary for a useful analysis will depend upon the particular apparatus, i.e. the more complicated the apparatus the more detailed the functional analysis will likely be. The functional analysis can be revisited, as an iterative process, as later analyses in this process demonstrate the need for further detail.

For illustrative purposes only, the process for performing a functional analysis for obtaining data for a ship known as the SES-200 is discussed below. The data obtained during the data collection provided a general understanding of systems, subsystems, and components in the ship and was utilized in the development of a more useful breakdown of the ship's functions. In this particular example, a cursory inspection of the ship provided a general view of the on-board systems of the SES-200 ship. Manuals and drawings regarding ship systems obtained during the data collection provided more information. Existing data as reported by a 1997 inspection by VC-6, the Naval Surface Warfare Center Combatant Craft Division, and Davis Boat Works was also analyzed. Data obtained on-site was also used to supplement existing data in understanding the functional relationships present on the SES-200. In particular, video footage and notes gathered during an on-site assessment during the data collection allowed for a detailed breakdown of the ship systems.

One type of data obtained on-site that was very useful during this step was the development of an as-built system architecture. During the data collection step, individual transfer systems were traced through the ship and records were generated, identifying locations of bulkhead penetrations and system start and end points. A hierarchy based on functional systems, subsystems, and components was developed from the obtained data on the system architecture. The associated primary and secondary function at each level was then investigated and documented.

Figure 4:
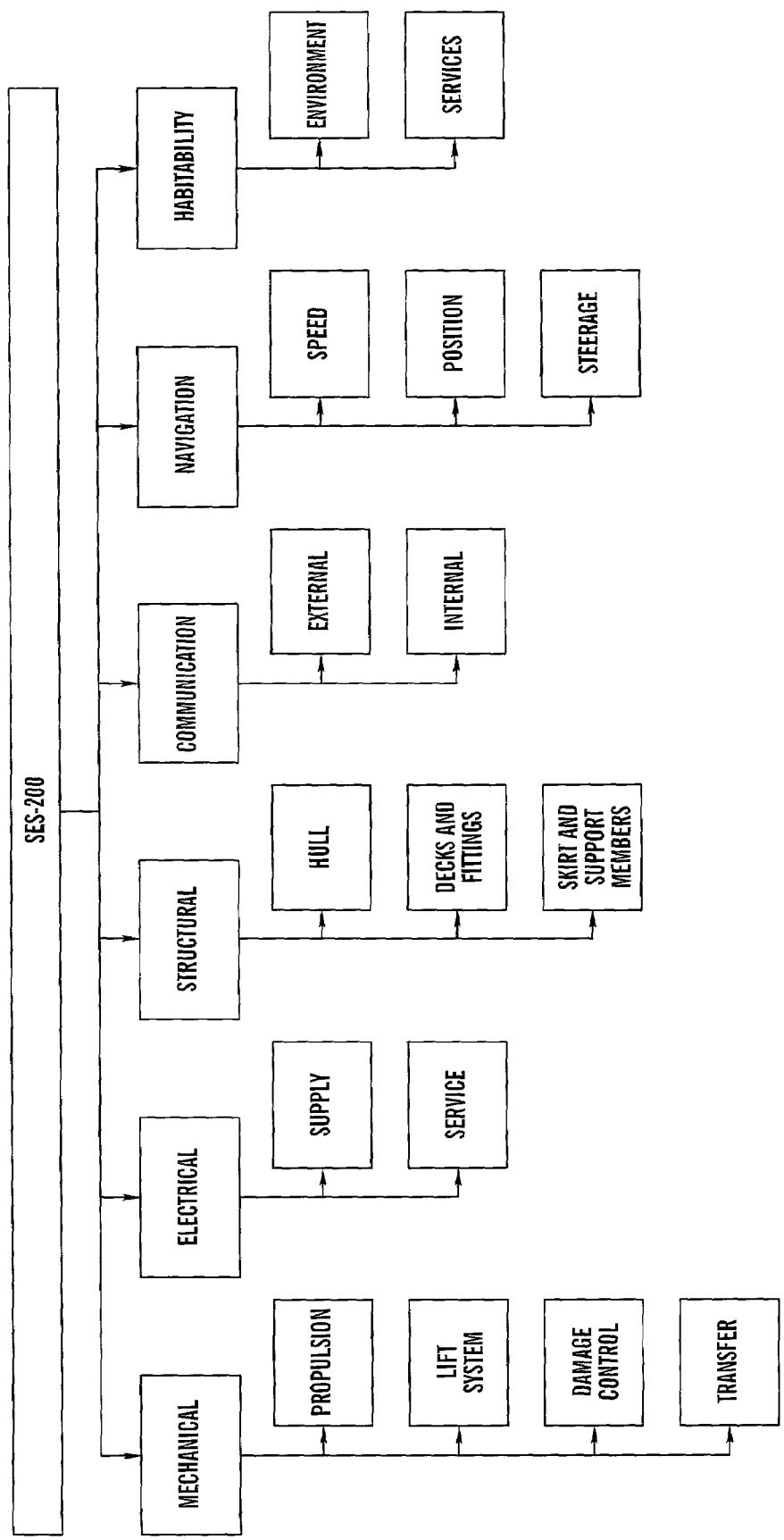
FIG. 4 is a screen shot of a function tree for systems, subsystems, and components in the apparatus.

In this particular example, the hierarchical nature of the function analysis is captured in two distinct manners in the remanufacturing system 12, although other manners for recording the functional hierarchy could be used. Referring to FIG. 4, a screen shot of a function tree for this particular example is illustrated. The function tree represents the hierarchy of function systems, subsystems, and/or components in the apparatus, in this example the ship, and depicts relationships between systems, subsystems, and/or components. In the analysis of this ship known as SES-200, six function groups were identified: Mechanical: Electrical; Structural; Communication; Navigation; and Habitability. Each of these function groups was then broken down to further detail as needed for the particular application. For example, the Mechanical function group or system was divided into propulsion, lift, damage control, and transfer subsystems. The subsystems can be broken down further into more subsystems or components depending upon the particular application and the desired level of detail.

Once this breakdown was completed for all systems, the information was also gathered into a function matrix. Referring to FIG. 5, a screen shot of a portion of the function matrix for this particular example is shown. The function matrix is a chart used to identify each component and its respective function(s), as well as the overall function(s) of the subsystem and system that the component belongs to. For systems with a high degree of interrelation, the system architecture drawings were revisited to verify the primary and secondary functions of components.

Referring back to FIG. 2, in step 44 an assessment of the condition of the apparatus to determine the state of each of the systems, subsystems and/or components is conducted. The physical condition of each of the components is assessed and recorded in the remanufacturing system 12. A variety of different types of physical conditions can be assessed, such as the level of corrosion, existence of fractures or cracks, level of wear, etc. The particular types of physical conditions assessed can vary based on the particular application. In this particular embodiment, the remanufacturing system 12 makes an assessment of the overall condition of each of the systems, subsystems, and components based on the assessed physical condition of the components. A variety of different metrics or techniques can be used by the remanufacturing system 12 to assess the overall condition based on the assessed physical conditions, such as the number of physical conditions identified with problems for each component, e.g. the more problems a system, subsystem or component has the lower the overall condition rating, or by weighting the importance of identified problems with a particular physical condition for a component, e.g. one major problem with one type of physical condition for a component may require a lower overall condition rating then several minor problems with the physical condition of that same component. The condition assessment outlines the technical feasibility of and provides an initial assessment of remanufacturing options for each system, subsystem, and/or component identified in the function analysis in step 42.

For illustrative purposes only, the process for performing a condition assessment for the ship known as the SES-200 is discussed below. The data obtained during the data collection along with the functional analysis was used in the condition assessment. Detailed information on the conditions of systems, subsystems and components was complied. Based on data obtained during the data collection, a determination was made that a more detailed investigation of the ship's propulsion engines was necessary. Accordingly, detailed reports for the drive engines and ship service diesel generators were compiled and input into the remanufacturing system 12.

In particular, a determination was made that a more detailed inspection of the hull and hull welds was required, due to the relative inactivity of the ship and lack of an enforced PMS. The inspection was limited to the interior hull since the ship was docked at pier side. The inspection was conducted in all accessible spaces with the exception of closed tanks and voids, as this would have mandated air sampling and atmospheric evacuation. Two non-destructive techniques were selected as assessment methods: Visual Inspection and Dye Penetrant. The visual inspection technique was conducted with the use of a 500-watt light system, 10× magnifying lens, brass bristle (non-explosive) brush, and small hand held dental picks. The liquid dye penetrant inspection used a three-part process manufactured by Magnaflux. The first step was the application of an aerosol based cleaning propellant to remove oils and contaminants. Step two was the application of a red liquid dye penetrant with the last step being the application of the developer. This non-destructive test method is used to highlight small surface cracks that might otherwise be missed through conventional visual inspection. The inspection was conducted from the bow of the vessel on the starboard side to the furthest most aft compartment. Within each frame the hull was visually inspected from the lowest weld point to the highest weld of the upper deck. Upon completion of the hull inspection in each frame area, four welded surfaces were examined using liquid dye penetrant. The same procedure was conducted on the port side of the ship.

Although in this particular embodiment detailed condition assessments of the engine and hull were made, detailed assessments of other portions of the ship could also have been made. The particular sections of an apparatus as well as the level or depth of the condition assessment will vary based upon the particular application. In this particular embodiment, the data collected for the condition assessment was entered into the remanufacturing processing system 12 for processing to determine a condition assessment for the systems, subsystems and components of at least a portion of the apparatus.

Referring to FIG. 6, a screen shot of a condition assessment data sheets is illustrated. Details concerning the components are recorded or captured in the condition assessment data sheet at the level of the system or sub-system in which those components resided. In this particular example, the fields in the condition assessment data sheet include:

a photo that is representative of the system or sub-system in question the ESWBS number used for classification by the Navy the Function Group, System, and Sub-system names a scale drawing of the ship profile to show location text fields to document frame and ship locations text fields for manufacturer information such as model and serial number text field for details not captured in the Condition Assessment Matrix the "rolled-up" condition assessment as shown in the Condition Assessment Matrix Although certain fields are shown in this particular example, the fields can vary as required for the particular apparatus being assessed for remanufacturability.

Referring to FIG. 7, a screen shot of a condition assessment matrix is illustrated. The condition assessment matrix is used to capture general condition information at every level of the system hierarchy as determined in the function analysis in step 42. Common physical conditions, such as corrosion, leakage, excessive wear, and missing parts were used in the matrix as headings for a checklist designed for the efficient collection of condition assessment data, although the particular physical conditions examined can vary based upon the particular application. An evaluation of the physical conditions for a system, subsystem, and/or component provides a basis for a determination of an overall condition assessment for the system, subsystem, and/or component as discussed earlier.

By way of example only, the overall condition of the hull and welds that were examined was determined to be very good based on an examination of the physical conditions of the components of the hull. The metal surfaces did not exhibit signs of buckling or distortion. Surface examination of the aluminum plating showed the metal to be free of corrosion or erosion. There was little if any evidence of the galvanic corrosion that would be common in the vicinity of dissimilar metals and an electrolytic bridge (solution). The bilge pockets did contain large accumulations of oily water and surface growth. The use of a soft brass brush was able to remove most of the growth and debris, revealing clean metal surfaces. The inspection of the welds provided few signs of cracking or surface defects. In some situations there were surface appearances of slag build up from the initial welding procedure. Welds, for the most part, were reasonably free from undercut and overlap.

Referring back to FIG. 2, in step 46 the remanufacturing processing system 12 determines whether the systems, subsystems, and/or components in the apparatus satisfy operational specifications for the systems, subsystems, and/or components identified during the data collection step 40 and function analysis step 42. More specifically, in this particular embodiment the function analysis hierarchy obtained in step 42 is used to model/map out the systems, subsystems, and/or components that need to be addressed in the assessment of the operation specifications. The operational specifications may include a variety of different requirements, such as the originally required operating specifications and/or functional requirements for that system, subsystem, or component, new specifications and/or functional requirements requested by the customer for a system, subsystem, or component and/or new operating specifications and/or functional requirements resulting from the use of new technology for one or more of the for the systems, subsystems, and/or components in the apparatus.

The data relating to the operating specifications obtained for this step is generally used in two ways, although other options for using this data are possible. First, the identified operation specifications can be and is used in this particular example to assess and identify viable remanufacturing options. For example, if the current operation specification of a system, subsystem, and/or component is not up to today's standards, then it is a prime candidate for modification or replacement, not restoration or reuse. Second, the identified operation specifications may be used in the future when another conversion or technical upgrade occurs. The analysis in this step will verify that existing function relationships are not violated and/or that supporting systems, subsystems, and/or components will meet the new requirements.

For illustrative purposes only, the process for performing an assessment of the operation specifications for the ship known as the SES-200 is discussed below. Initially, the function analysis hierarchy from step 42 is used to model/map out the systems and subsystems that needed to be addressed in the assessment of the operation specifications. Next, data, drawings, and other information obtained in step 40 were searched to locate the operation specifications. For example, information read directly off components and nameplates captured on digital video during on-site evaluations which were entered into the remanufacturing processing system 12 were used. In addition, remanufacturing processing system 12 was used to conduct web searches on the Internet 16 to identify manufacturers of a system, subsystem, and/or component, such as a manufacturer at component information system 14, to request operation specifications. The operation specifications impact which remanufacturing option will be chosen for the particular system, subsystem, or component. The assessment of the operation specifications may need to be revisited to ensure that all standards are still being met.

Referring to FIG. 8, a screen shot of an operation specification matrix is illustrated. The operation specification matrix in the remanufacturing processing system contains operation specifications for a system, subsystem, and components, such as a component's make, model and original equipment manufacture specifications. If a technology upgrade is going to be used for a system, subsystem or component, then the operation specification matrix will be expanded or updated to include the new operation specifications.

Referring back to FIG. 2, in step 48 an analysis is performed to determine a risk priority or criticality of components, subsystems and/or systems in the apparatus. An analysis of risk priority involves analyzing factors, such as possible failures of a component, subsystem and/or system, the effect of a failure on the component, a subsystem, and/or a system, and the frequency and severity of possible failures within existing systems, subsystems and/or components, all of which can affect the assessment of the viability of remanufacturing options.

In this particular embodiment, a failure mode, effects, and criticality analysis (FMECA) is used, although other types of analysis for risk priority can be used depending upon the particular application. FMECA is a systematic approach used to determine the causes, results, and severity of the failure of a system, subsystem and/or component. FMECA allows for a subjective, yet qualitative, evaluation of the frequency and severity of possible failures within in a system, subsystem, and/or component. FMECA also allows for the identification of actions required to eliminate or reduce the chance of a specific failure occurring. Further, FMECA can be used to identify potential system failure modes resulting from system, subsystem, and/or component interrelationships and/or interactions. For example, FMECA can be used to identify the impact of technological upgrades to systems, subsystems, and/or components and possible failures. FMECA can also be used for the general design of a system, subsystem, and/or component and the design of the processes to manufacture those systems, subsystems, and/or components. By assessing factors, such as risk of failure and associated with remanufacture options, FMECA provides an important step in the remanufacture assessment process.

For illustrative purposes only, the process for performing an assessment of the risk priority of systems, subsystems, and/or components for the ship known as the SES-200 is discussed below. Brief description of each of the categories analyzed to assess the risk priority of systems, subsystems, and/or components in the ship in this particular embodiment are provided below:

Subsystem: Part description (from function analysis in step 42)

Function: Role of part in system (from function analysis in step 42); This column identifies the fundamental role the item plays in the system.

Failure modes: The manner in which the item could fail to meet its design intent (based on function analysis in step 42). The failure mode of an item can either state the intended function that is not being performed or can state a defect in the item. For example, one failure mode of an engine could be "cracked piston" (describing a defect). Another failure mode could be "valves stick" (describing a function not being performed). One item may have several failure modes. A new row is identified in the worksheet for each new failure mode.

Causes: Typical reasons for part failure; the event or condition that leads to the failure mode. The cause of a failure mode can be brought about by the failure modes of other items. One failure mode may have several different causes.

Local effect: The effect of the failure mode on the part or system that fails. Local effects refer to the instantaneous results of failure on the component, subsystem, or system in question.

Secondary Effect: What happens to the system which contains the part when failure occurs; this is the intermediate effect of the failure mode. This category includes adjoining parts and systems as well as systems directly linked to the failure part or system. This category also includes secondary effects to the failure on the component, subsystem, or system.

Ultimate Effect: What happens to the overall system or subsystem when part failure occurs; the global effect of the failure mode. This category includes the long-term effects of the failure mode to failure component, related subsystems and/or systems, operator, and environment. Effects of failure that may not be realized for long periods of time or operation are accounted for in this column.

Detection: The method by which the failure mode is discovered. Detection methods can range from an alert signal before a potential failure mode develops to the complete and possibly catastrophic failure of the entire product without any form of warning. Detection can be visual, such as a warning light or observed aberrant performance. Detection methods can be audible, such as a buzzer or perceptible change in the regular noise of the unit. Other detection methods can include an odd smell (from a burning motor) or things like a marked increase in vibration. Detection may be designed into a component, subsystem, or system or may simply be a by-product of the failure mode.

Severity: A rating of the seriousness of the effect of the potential system failure mode. Severity applies only to the effect of a failure mode. This category identifies the seriousness of the failure mode to the operation of the product, the safety of the user, and effects on the environment. This scale runs from one to ten, with one being a minor inconvenience that does not affect the performance of the system, subsystem, or component and ten being a catastrophic failure of the system, subsystem, or component with possible harmful effects to the user and environment.

Occurrence/Frequency: A rating corresponding to the estimated cumulative number of element failures that could occur over the design life of the system. Alternatively, Occurrence is a rating corresponding to the likelihood that the cause will occur over the design life of the system, subsystem, or component. The scale measures frequency and runs from one to ten, with ten being the highest rate of occurrence.

RPN: Risk Priority Number; product of frequency rating and severity rating

Although certain categories are set forth above, other categories can be used in conjunction with or in place of some or all of the categories above, depending upon the particular application.

One of the most difficult tasks in this risk priority analysis is in the determination of how much detail is required. A filter may be applied at the function analysis stage of the process to determine how far to go down in the hierarchy. Too many hierarchical levels can render this risk priority analysis to be to time consuming and cost prohibitive. However, too little detail may render the risk priority analysis useless. The appropriate level will depend on the particular application. Again one example for a ship is set forth herein.

In this particular embodiment, the functional analysis from step 42 provides the level of systems, subsystems, and components of the ship for the remanufacturing system 12 to evaluate. Next, FMECA is used to identify potential failure modes for each of the systems, subsystems, and components.

Next, once the potential failure modes are identified, then the possible cause(s)/mechanism(s) of these failures must be determined in this particular embodiment. In general, a system failure mode can be caused by one or more element failure modes, or by:

Interface or interaction between components, subsystems and/or systems

Interaction of an components with other subsystems and/or systems

Interaction with the environment

Interaction with customer (including ergonomics, operation instructions)

Each failure mode may have more than one cause.

Next, in this particular embodiment the pertinent effects of the specified failure are determined in the remanufacturing system 12. Here, the consequence of the loss of the function of a specific system, subsystem, or component results in effects on several levels. In this particular embodiment, the pertinent effects are a local effect, secondary effect, and an ultimate effect, although the pertinent effects can vary based on the particular application. The local effect identifies the result of the failure on the system, subsystem, or component itself, the secondary effect identifies the result of the failure on other systems, subsystems, and/or components (based on part interrelationships), and the ultimate effect is the result on the entire apparatus, or the ship in this particular example.

After the effects and detection methods have been identified, the severity and occurrence ratings must be determined to calculate the Risk Priority Number (RPN) in the remanufacturing system 12 in this example. The severity rating is based on the effect the failure will have on other systems, subsystems, and/or components, the ship, and other factors, such as the customer government regulations in this particular embodiment. The occurrence rating corresponds to the estimated cumulative number of failures or likelihood that the failure will occur over the design life of the system, subsystem, or component. The severity and occurrence ratings are selected based on the criteria stored in tables in remanufacturing processing system 12. Although tables for severity and occurrence ratings are used in this particular example, other types of ratings and/or other numbers of tables can be used for this analysis depending upon the particular application.

In this particular embodiment, the RPN is computed directly as the product of the severity and occurrence ratings. By themselves, RPNs have no value or meaning. RPNs are used to identify potential deficiencies in critical components, subsystems, and/or systems. The RPN gives an indication of the overall seriousness of the failure mode. A failure with a high RPN will merit more re-engineering attention than several failure modes with lower RPN values. These RPN values can then be used in conjunction with the condition assessment and operation specifications to assess the viability of remanufacturing options for each component, subsystem, and/or system.

Referring to FIGS. 9A and 9B, a screen shot of a FMECA matrix for a portion of the systems, subsystems, and components in the ship are illustrated. Each system, subsystem, and/or component identified in the FMECA matrix correlates back to the detail provided in the function analysis in step 42. The failure modes are defined as the failures of the components of each subsystem. For example, the failure modes of the Drive MTU's corresponds to the failure of each of the components of the MTU's defined in the function analysis, such as: mounting fails, remote control from bridge fails, ignition fails, etc. High RPNs are used to identify critical elements for each system, subsystem, or component and the ship as a whole in this particular example. This risk priority is used as one of the criteria in identifying possible remanufacturing options and will be discussed further in the next section.

Referring back to FIG. 2, in step 50 the remanufacturing processing system 12 uses the determination of the overall condition, the determination of whether the operation specifications are satisfied, and the determination of the risk priority to assess a viability of remanufacturing options for each system, subsystem and/or component, although other factors and other combinations of factors could be considered to assess the viability of remanufacturing options.

In this particular embodiment, there are five remanufacturing options, although the number and type of remanufacturing options can vary as needed or desired for the particular application. The five remanufacturing options in this embodiment are: reuse; restore; modify; replace; and remove. Each option show a different recovery intent. Reuse is the extension of the operational life of systems, subsystems, and/or components exclusively through cleaning and validation processes. Restore is the return of systems, subsystems, and/or components to their original specifications through cleaning, rework and validation processes. Modify is the alteration of existing systems, subsystems, and/or components in order to solve known problems, to perform technological upgrades and/or to meet current standards. Replace is the removal of worn systems, subsystems, and/or components that cannot be economically modified, restored or reused, and the subsequent insertion of identical or upgraded items, parts or subsystems. Remove is the extraction of systems, subsystems, and/or components formerly used to serve a function no longer necessary in the new design.

Figure 10:
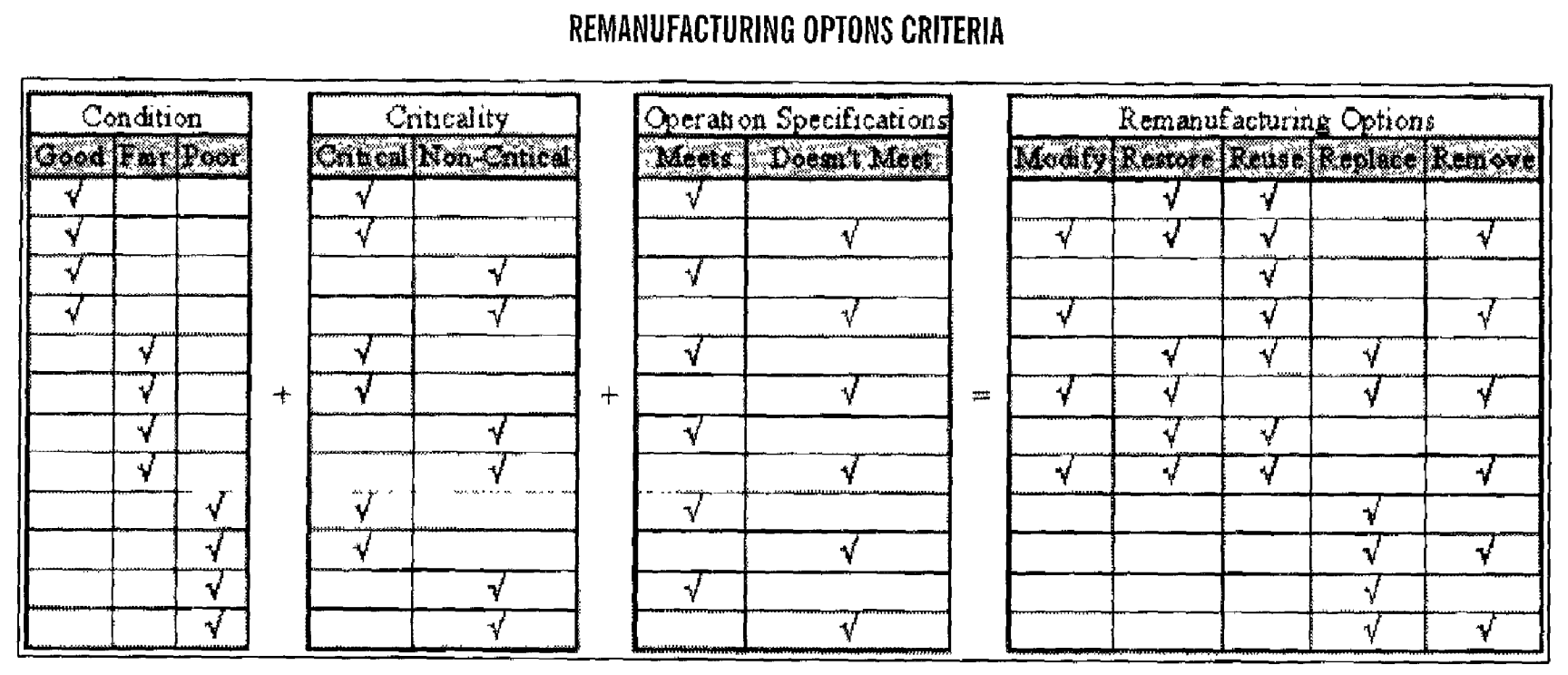

Referring to FIG. 10, a table with the remanufacturing options criteria are illustrated. The condition assessment determined whether the systems, subsystems, and/or components was in poor condition, fair condition, or good condition. The operation assessment determined whether the systems, subsystems, and/or components met today's operating standards. The risk priority or criticality assessment determined whether the systems, subsystems, and/or components are critical or non-critical, based on their RPN. Based on these assessments, possible remanufacturing options for each system, subsystem, and/or component can be identified.

In this particular embodiment, each of the prior assessments in steps 44, 46, and 48 is used in deciding the viability of possible remanufacturing options, although other combinations of and different assessments may also be used in deciding the viability of possible remanufacturing options. A variety of different techniques or algorithms can be used by the remanufacturing processing system 12 to synthesize the condition assessment in step 44, the operational assessment in step 46, and the risk priority or criticality assessment in step 48 to make the assessment of the viability of remanufacturing options.

By way of example only, for each system, subsystem, and/or component, the condition assessment, the operation assessment, and the risk priority or criticality assessment may have eliminated one or more remanufacturing options as not feasible. As a result, the remanufacturing system 12 may determine that any remanufacturing option for a system, subsystem, or component that is determined to be viable for the condition assessment, the operation assessment, and the risk priority assessment is a viable remanufacturing option for that system, subsystem, and/or component. In another example, the assessment by the remanufacturing system 12 for viable remanufacturing options may weight and score the results from the different assessments in steps 44, 46, and 48 to obtain a total score which can be used to identify viable remanufacturing options and also to identify which option is the best possible remanufacturing option for each system, subsystem, and/or component, which option(s) is/are possible options for each system, subsystem, and/or component, and which option(s) is/are not feasible. Although a few examples of steps for assessing a plurality of remanufacturing options for an item based on the condition assessment, the operation assessment, and the risk priority or criticality assessment, other types of steps using other assessments and/or combinations of assessments may also be used depending upon the particular application.

For illustrative purposes only, the process for assessing the viability of remanufacturing options for systems, subsystems, and components for the ship known as the SES-200 is discussed below. Referring to FIG. 11, a remanufacturing options matrix for a portion of the systems, subsystems, and components for the ship determined by the remanufacturing processing system 12 as described herein is illustrated. This matrix indicates the best possible, possible and not feasible remanufacturing options for systems, subsystems, and components for the ship. Typically, the best possible remanufacturing option will be recommended for and selected for implementation, although one of the possible remanufacturing options may be selected if other factors are involved, such as cost or time.

Referring back to FIG. 2, in step 52 the remanufacturing processing system 12 collects cost or economic data for each remanufacturing option for every system, subsystem, and/or component in the apparatus to determine the most economical remanufacturing option. In this particular embodiment during the data collection in step 40, OEM information, model numbers, serial numbers for all the components, subsystems, and systems onboard the apparatus, in this example the ship, along with phone numbers and address information for manufacturers of systems, subsystems, and/or components were collected, although other types of data could have been obtained. This data can be used by the remanufacturing processing system 12 to track down cost data on systems, subsystems, and/or components.

Additionally, during the function analysis in step 42 a function hierarchy was developed to identify the relationships between various systems, subsystems, and/or components. In this particular embodiment, this functional hierarchy is used during the cost data collection to identify "individual" and "rollup" economic items. Cost data is collected on systems, subsystems, and/or components that are identified as independent economic entities (i.e. independent components, subsystems, or systems are separate purchase items). Cost data is not obtained independently for those items that are identified as being included in the cost data of another system or subsystem because the value of each of these rollup items is already included in the analysis of those systems or subsystems.

Based on this obtained data from step 40 and the function analysis from step 42, the remanufacturing processing system 12 obtains cost estimates for each of the various remanufacturing options for the individual components, subsystems, and systems. By way of example only, the remanufacturing processing system 12 may use the Internet and/or the Thomas Register, an organized list of American and Canadian Original Equipment Manufacturers (OEM's), to acquiring cost data based on data obtained in step 40. Additionally in this particular embodiment, the remanufacturing processing system 12 may transmit digital images of systems, subsystems, and components on the ship along with system architecture drawings acquired during data collection in step 40 to vendors to enable the vendors to provide accurate cost data on remanufacturing options without physically visiting the apparatus, in this example the ship.

Figure 12:
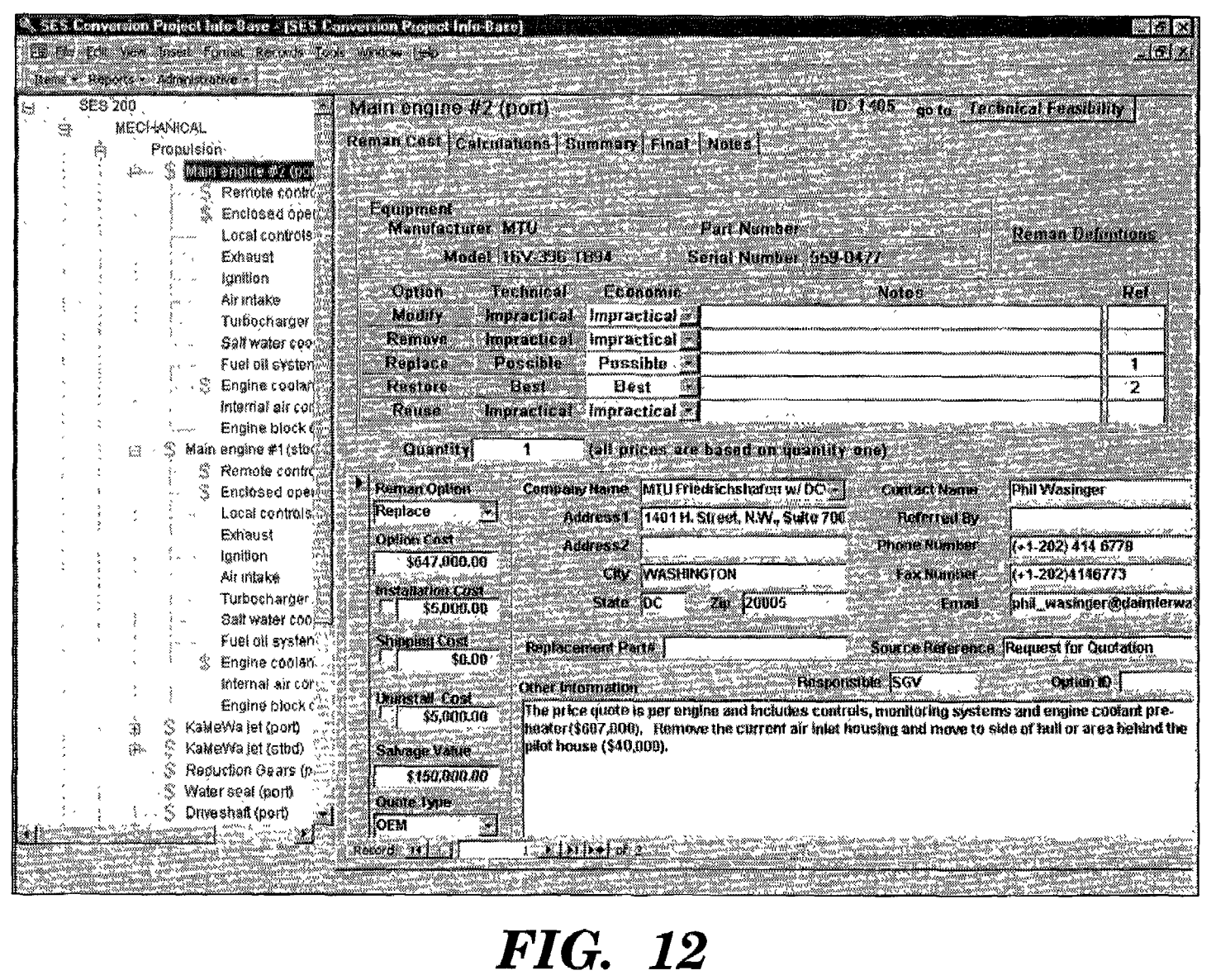

Referring to FIG. 12, a screen shot of a conversion project information base used to collect cost data in this particular embodiment is illustrated. The information base is designed to hold cost data for a system, subsystem, or component collected from various vendors for different remanufacturing options. The information base may also include an optional text field titled, "Other Information" to capture any relevant cost data that may have significance in the assessment of remanufacturing options. Referring to FIG. 13, a screen shot of a cost data availability matrix that is used to collect cost data in this particular embodiment is also illustrated.

The remanufacturing processing system 12 may establish an optional cost pareto to separate all of the bundles of cost data into three categories: High dollar, Low Dollar and Questionable value. Those items, i.e. systems, subsystems, and/or components, that exceeded a predefined threshold are placed into one of these three categories based on the expected cost of the system, subsystem, or component. The remanufacturing processing system 12 can combine these items together as the cost data is being collected to determine if the remanufacturing of the high dollar items might exceed the cost of buying an entire new apparatus, in this example a ship. This optional step will prevent needless work if it is determined at an early stage that the majority of the apparatus' remanufacturing cost is associated with only a handful of systems, subsystems, and/or components and those systems, subsystems, and/or components have already exceeded the cost of a new apparatus.

Once the cost data is collected, a determination can be made about which of these remanufacturing options represents the best value, while still ensuring the system, subsystem, or component satisfies the operation specifications. For example, if a watertight door could be cleaned and undergo a validation testing while maintaining the function, performance, and reliability of a new door and at a lower overall cost, then reuse of the door would make the best economic sense. Another factor which may be considered by the remanufacturing system 12 in obtaining the cost data is whether obtaining systems, subsystems, and/or components from the same source provides any economies of scale that need to be taken into account.

Referring back to FIG. 2, in step 54 a reassessment of the remanufacturing options for the systems, subsystems, and/or components is conducted by the remanufacturing processing system 12. The reassessment accounts for additional information gathered during the cost data collection in step 52 and reduces the number of feasible remanufacturing options for each system, subsystem and/or component. This reassessment incorporate the recognition of scenarios for groups of systems, subsystems and/or components in which the remanufacturing options of one group directly affected the feasibility of others. This reassessment provides the optimal remanufacturing option or options for each system, sub-system, and component.

In this particular embodiment, two sources of prior assessments are used to perform the reassessment of remanufacturing options, although numbers and sources of prior assessments can be used. The first source is the assessment of remanufacturing options obtained in step 50. The second source is the assessment of cost data collected in step 52. The reassessment process simply requires revisiting the remanufacturing options identified for each system, subsystem, and/or component by considering the additional information gained from the assessment of the cost data that was collected. The process for the reassessment in step 54 is the same as that for the initial assessment in step 50, except that the reassessment takes into account other assessments and/or data, such as the cost data assessment from step 52.

In this particular embodiment, certain circumstances encountered during the reassessment required special treatment, although not all reassessments will require special treatment. These special cases are labeled as scenarios. In some cases, the remanufacturing option assigned to one system, subsystem, and/or component affects the feasibility of a remanufacturing option of an independent system, subsystem, and/or component. Scenarios were constructed in order to account for these complex relationships. Unlike the rest of the systems, subsystems, and/or components that underwent a value analysis as mutually exclusive entities, scenarios underwent value analysis as a group of systems, subsystems, and/or components.

In this particular example for the ship, the only instances in which scenarios were identified was the relationship that exists between the remanufacturing options of the Kim Hot-start coolant pre-heater and the MW main engine. Referring to FIG. 14A, after the initial assessment the best option for the MTU was the restore option and the replace option was assessed as a possible option. Referring to FIG. 14B, after the reassessment the best option for the MTU was the replace option and the restore option was assessed as a possible option. As independent items, these systems, subsystems, and/or components are evaluated as described above and shown in FIGS. 14A and 14B. However, it was determined that a new replacement MW engine contains an internal coolant preheater and thus does not require a component serving as an external coolant preheater like the Kim Hotstart. As a result, three scenarios were identified to capture this special relationship as shown in FIG. 14C.

Referring back to FIG. 2, in step 56, the remanufacturing processing system 12 conducts a value analysis to evaluate the reassessed remanufacturing options identified for each system, subsystem and/or component and to compare scenarios. This is accomplished by the remanufacturing processing system 12 evaluating each remanufacturing option based on a set of metrics. The result of the value analysis is the identification of an optimal remanufacturing option (OReO) for each system, subsystem and/or component.

The objective of any value analysis is to determine the feasibility of performing an operation, process, or project. The value analysis is not simply based on cost. In this particular embodiment, the value analysis is broken into four distinct phases: performance criteria definition, weighting, rating, and scoring, although other types of value analyses as well as other phases and combinations of phases can be used.

In this particular embodiment, the initial step in the value analysis process is the recognition and definition of the criteria or metrics being used to evaluate and select remanufacturing options. The value analysis allows for diverse criteria to be incorporated into the analysis and recommendations. It is also capable of combining benefits and comparing potential alternatives for implementation. The metrics that are selected are used to compare the value of one remanufacturing option to another. In this particular embodiment, for the value analysis of the remanufacturing options for the ship, the following metrics were used:

Cost—includes purchase cost, installation cost, removal cost, shipping cost, and salvage value Life Expectancy—anticipated service life of system, subsystem, and/or component Improved Performance—additional operational performance gained from a component/system (e.g. increased efficiency, improved accuracy, speed, power, etc.)

Operation Cost—cost associated with operating the system, subsystem, and/or component (e.g. fuel, electricity, other consumables)

Maintenance Cost—cost associated with preventive and unscheduled maintenance of the system, subsystem, and/or component Additional Environmental Performance—improved environmental performance exceeding current regulations/guidelines (e.g. lower emissions, decreased biological impact, etc.)

Although the metrics listed above were used in this particular embodiment, other metrics and combinations of metrics can be used as needed or desired.

In this particular embodiment, each remanufacturing option is rated against these metrics for each system, subsystem, and/or component identified on the SES-200 to select the best value alternative. Weights are not assigned for rollup economic items as the value of these items are rolled up into another system, subsystem, and/or component. For cases where specific scenarios have been identified as discussed with reference to step 54, the entire system, subsystem, and/or component affected by the scenario will be evaluated as one element against each of these metrics.

As with any evaluation process, weights must be assigned to measurement criteria to determine the relative importance of one metric to another. Traditionally, choices between potential alternatives are selected based on subjective weighting of the criteria and risk. While there are many different approaches that can be used to determine the importance of each metric in relationship to the others, in this particular embodiment the paired comparison method is used. This mathematics-oriented process reduces much of the subjectivity of comparative analysis. The paired comparison method is based on the assumption that the simplest and least emotional decision considers only two criteria at a time and determines which is more important. In essence, it only requires an answer to "is criteria A more important than criteria B?", rather than a judgmental "how much more important is criteria A than B?". By comparing each criterion against the other in this fashion, the relative importance, or weight, of each metric is easily established. Using a paired comparison matrix, one can easily record and tally these decisions.

Referring to FIG. 15, one example of a paired comparison matrix is illustrated. With the paired comparison matrix, criterion A is compared against criterion B, C, D, E, and F, and the letter relating to the more important criterion is recorded in the box that intersects Row A and the column B, C, D, E, or F. Once A has been compared against other criteria, the process is repeated for criterion B. Since criterion B has already been compared to A, it only needs to be compared against C, D, E, and F. This process continues until each criterion has been evaluated against the other.

For purposes of illustration only, one example of the value analysis of the KaMeWa waterjets in the SES-200 using the paired comparison matrix is illustrated in FIG. 16. In this example, six metrics were used for the value analysis of the KaMeWa waterjets. The letter in the box relates to the letter code of the criteria that is considered the most important in the comparison between the related pair of criteria. For example, Life Expectancy (B) is considered more important than Cost (A), so the related column receives a B. The number of times each criterion is selected is totaled by counting the number of times A, B, C, D, E, and F occurred. This quantity is entered in the Total column. Once the totals for each criterion have been determined, percentages are calculated and assigned as the weight of the criteria. Note that one criterion should always be zero (i.e. if A is more important than B and B is more important than C, then A must be more important than C). This does not mean that the criterion is not important, rather that it is the least important of the criteria.

Once the relative importance of the criteria has been determined and weights have been assigned, each remanufacturing option is rated by the remanufacturing processing system 12 based on each of the defined metrics. In this particular example, a scale of one to five was used with five representing excellent performance and one representing unsatisfactory performance, although other scales could be used. For consistency, each option was rated for a specific criterion before proceeding to the next criterion. Note that any option that does not meet the minimum acceptable level for the defined metrics must be eliminated from consideration. Referring to FIGS. 17A and 17B, ratings for the KaMeWa waterjets in the defined metrics for each remanufacturing option are illustrated for this particular example.

After the ratings have been assigned to each remanufacturing option, the total score is calculated by remanufacturing processing system 12 by multiplying the weight for each criterion (relative importance of each criterion) by the rating for each criterion. This score is computed for each remanufacturing option of each economic item. Referring to FIGS. 18A and 18B, the scores for the KaMeWa waterjets in the defined metrics for each remanufacturing option are illustrated for this particular example.

The scores are then directly compared to determine the Optimal Remanufacturing Option, or OReO. In this particular example, the replace option scored higher than the restore option. Thus, in this example the replace would be identified as the OReO and would be selected as the remanufacturing option for the KaMeWa waterjets.

In this particular example, scenarios are applicable. These scenarios identify a relationship between the recovery options for the main MTU engines and the Kim Hotstart engine coolant pre-heaters. For the purpose of the value analysis, the components in these scenarios will be evaluated as a single system. Weights were identified for this scenario using the paired comparison method as shown in FIG. 19. Referring to FIGS. 20A-20C, the scores for each of the scenarios determined by the remanufacturing processing system 12 are illustrated. By comparing the total scores for these scenarios, it is evident that the purchase of a new main MTU engine with an internal engine coolant preheater is the optimal remanufacturing option.

Referring back to FIG. 2, in step 58 the remanufacturing processing system 12 conducts an economic analysis of the optimal remanufacturing option. The objective of this economic analysis is to collect and analyze the optimal remanufacturing options to determine the economic feasibility of remanufacturing the apparatus, in this example the SES-200. The percentage breakdowns, by item and cost, for the entire apparatus are compared to industry benchmarks for remanufacturing. The final cost to remanufacture the apparatus (which is the sum of the cost for each optimal remanufacturing option) is compared to the estimated cost for a new apparatus. The percentage cost to remanufacture the apparatus is also compared to industry benchmarks for remanufacturing. The final recommendation in this economic analysis is based on these comparisons.

In this particular embodiment, the economic analysis is broken into four sections. The first section details the percentage breakdowns for each remanufacturing option based on the total number of items. The second section details the percentage breakdown based on cost. The third section is the total cost for each function group and the entire SES-200. The fourth section compares the total cost to remanufacture the SES-200 to industry benchmarks.

Figure 21:
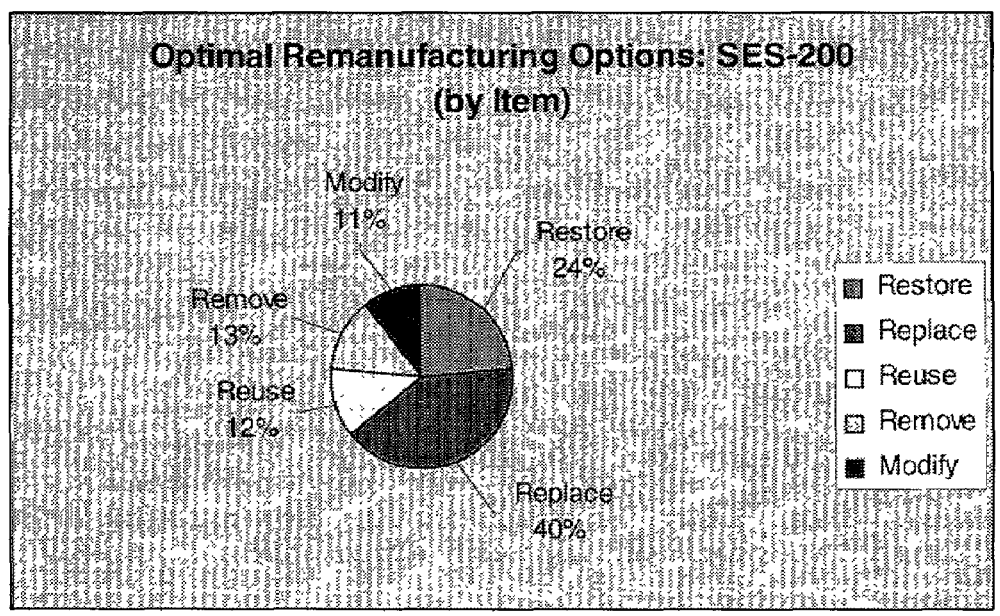
FIG. 21 is a screen shot of an economic analysis by item.

Referring to FIG. 21, in this particular example when analyzing the economics based on the number of items, the replace option was the most prevalent remanufacturing option at 40%. The restore option was the second most prevalent option at 24%. The remove, reuse, and modify options were all about the same at 13%, 12%, and 11% respectively.

Figure 22:
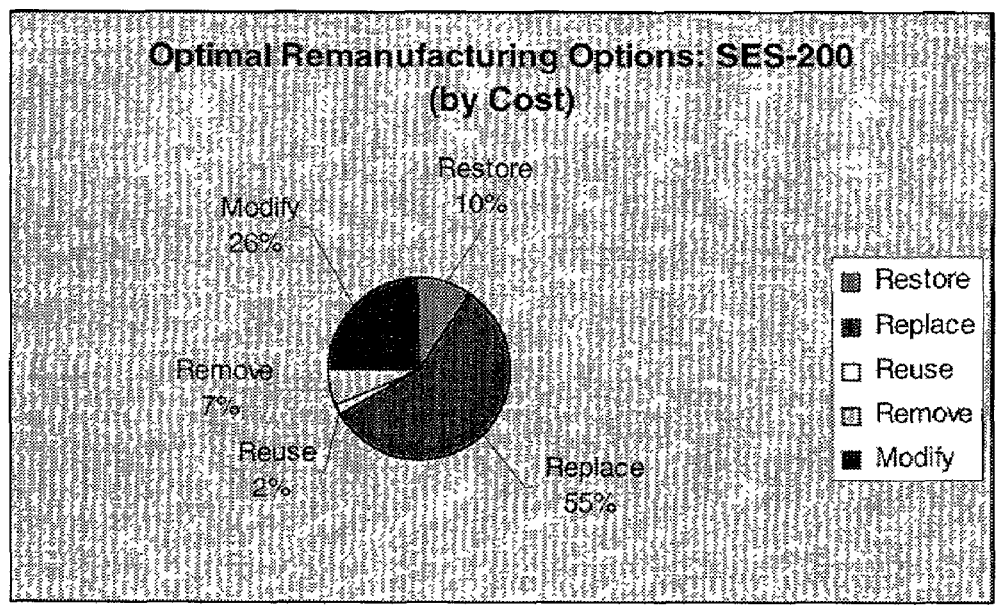
FIG. 22 is a screen shot of an economic analysis by cost.

Referring to FIG. 22, in this particular example when analyzing the economics based on cost, the most costly option is the replace option which comprises 55%. The modify option is the second most costly option at 26%. The restore, remove, and reuse options are 10%, 7%, and 2%, respectively. In this particular example, a large portion of the replace cost (-$1,000,000) is the replacement of the both MTU drive engines. The cost to replace the MTU's is approximately 29% of the entire cost to remanufacture the SES-200. Another $650,000 of the replace cost is associated with the KaMeWa water jets ($205,400/jet), the main deck flooring ($110,000), the main air conditioning ($79,750), and the Halon system ($51,418).

Figure 23:
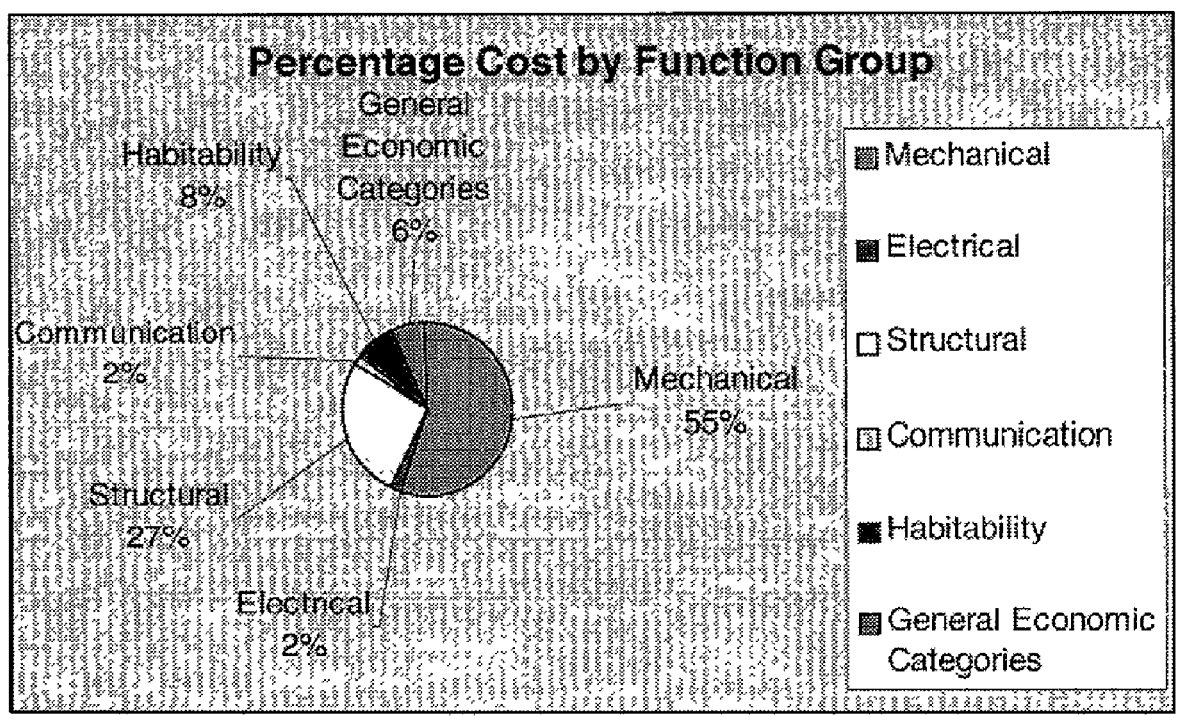
FIG. 23 is a screen shot of an economic analysis by function.

Referring to FIG. 23, in this particular example when analyzing the economics based on function the most costly group is the mechanical group which comprises 55%. Structural is the second most costly group at 27%.

Next, in step 60 the method in accordance with one embodiment of the present invention described above ends.

Again although one embodiment of the present invention has been described above with reference to one example for the assessment of the remanufacturability of a ship, the present invention can be used to assess the remanufacturability of a variety of different apparatuses, such as a vehicle, airplane, engine, copier, or other machine or system. Additionally, although in this particular embodiment the method is implemented in a remanufacturing processing system 12 as described herein, the method can be implemented in other manners and/or ways as needed or desired.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the invention is limited only by the following claims and equivalents thereto.

What is claimed is:

1. A method for assessing remanufacturability of one or more items in an apparatus, the method comprising:
    determining an overall condition of items in an apparatus regardless of the condition of each of the items based on obtained data;
    determining whether each of the items satisfies one or more operation specifications based on the obtained data;
    identifying one or more systems in the apparatus;
    identifying components in each of the systems;
    determining a functional hierarchy and interrelation of the systems and components;
    applying a filter to the determined functional hierarchy limiting the functional hierarchy to a specified level of the functional hierarchy; and
    assessing in at least one processing system a plurality of remanufacturing options for each of the items based on the determined overall condition of the items regardless of a condition of each of the items, the determined satisfaction of the operation specifications, the determined functional hierarchy and interrelation of the systems and components, and the specified level of the functional hierarchy to identify which of the plurality of remanufacturing options are viable and displaying one or more of the identified, viable remanufacturing options.

2. The method as set forth in claim 1 further comprising collecting the obtained data on the items.

3. The method as set forth in claim 2 wherein the collecting the obtained data further comprises:
    obtaining at least a portion of the data from stored information on the items;
    researching the items to obtain at least a portion of the data; and
    examining the items to obtain at least a portion of the data.

4. The method as set forth in claim 2 further comprising determining what types of the obtained data need to be collected.

5. The method as set forth in claim 1 further comprising identifying one or more subsystems, wherein the determining a functional hierarchy and interrelation determines the functional hierarchy and interrelation of the systems, subsystems and components, wherein the assessing a viability of a plurality of remanufacturing options for each of the items is also based on the functional hierarchy and interrelation of the systems, subsystems, and components.

6. The method as set forth in claim 1 wherein determining an overall condition of each of the items further comprises assessing one or more physical conditions for each of the items, wherein the overall condition of each of the items is based on the assessed physical conditions for the item.

7. The method as set forth in claim 1 wherein the determining whether each of the items satisfies one or more operation specifications further comprises:
  determining one or more component functions associated with each component; and
  determining manufacturing data for each of the components, wherein the operations specifications comprise the component functions and the manufacturing data.

8. The method as set forth in claim 7 further comprising:
  identifying one or more systems in the apparatus, each of the systems comprising one or more of the components; and
  identifying one or more system functions for each of the systems, wherein the operations specifications also comprise the component system functions.

9. The method as set forth in claim 7 wherein determining manufacturing data for each of the components further comprises at least one of:
  obtaining at least a portion of the manufacturing data from stored information on each of the components; and
  researching each of the components to obtain at least a portion of the manufacturing data.

10. The method as set forth in claim 1 wherein the remanufacturing options further comprise at least two or more of a modify option, a restore option, a reuse option, a replace option, and a remove option.

11. The method as set forth in claim 1 wherein the assessing a plurality of remanufacturing options further comprises identifying which one of the plurality of remanufacturing options identified as viable is an optimal choice and the displaying further comprises displaying the identified, optimal remanufacturing option.

12. The method as set forth in claim 1 further comprising obtaining cost data on each of the remanufacturing options for each of the items.

13. The method as set forth in claim 12 further comprising reassessing the plurality of remanufacturing options for each of the items based on the assessing of the plurality of remanufacturing options and the obtained cost data.

14. The method as set forth in claim 1 further comprising analyzing a value of each of the viable remanufacturing options based on two or more factors.

15. The method as set forth in claim 14 wherein at least one of the factors is a cost for each of the remanufacturing options.

16. The method as set forth in claim 14 wherein the analyzing further comprises:
  determining a weight for each of a plurality of measurement criteria;
  rating each of the remanufacturing options for each of the plurality of measurement criteria; and
  determining a total score for each of the remanufacturing options based on the weight and the scoring, wherein an optimal one of the remanufacturing options has the highest score.

17. The method as set forth in claim 1 further comprising analyzing an economic cost for at least one of the viable remanufacturing options.

18. The method as set forth in claim 1 wherein the assessing further comprises assessing whether one of the plurality of remanufacturing options is an upgrade that replaces two or more of the items with a smaller set of items.

19. The method as set forth in claim 1 wherein at least two of the plurality of remanufacturing options are potentially viable for each of the items regardless of the condition of the items.

20. The method as set forth in claim 1 further comprising determining a risk priority of each of the items based on the obtained data, wherein the assessing a viability of a plurality of remanufacturing options for each of the items also is based on the determined risk priority for each of the items.

21. The method as set forth in claim 20 wherein the determining a risk priority of each of the items further comprises:
  determining one or more failure modes for each of the items;
  determining one or more causes for each of the failure modes;
  determining one or more effects of each of the failure modes;
  determining a severity rating for each of the effects; and
  determining an occurrence rating for each of the effects, wherein the risk priority is derived from the severity rating and the occurrence rating for each of the effects.

22. The method as set forth in claim 21 wherein the effects comprise a local effect, a secondary effect, and an ultimate effect.

23. A system for assessing remanufacturability of one or more items in an apparatus, the system comprising:
  an overall condition processing system in at least one computing device that determines an overall condition of items in an apparatus regardless of the condition of each of the items based on obtained data;
  an operation specification processing system in the at least one computing device that determines whether each of the items satisfies one or more operation specifications based on the obtained data;
  a first identification system that identifies one or more systems in the apparatus and components in each of the systems;
  a functional analysis system that determines a functional hierarchy and interrelation of the systems and components;
  a filtering system that applies a filter to the determined functional hierarchy limiting the functional hierarchy to a specified level of the functional hierarchy; and
  a remanufacturing assessment processing system in the at least one computing device that assesses a plurality of remanufacturing options for each of the items based on the determined overall condition of the items regardless of a condition of each of the items, the determined satisfaction of the operation specifications, the functional hierarchy and interrelation of the systems and components and the specified level of the functional hierarchy to identify which of the plurality of remanufacturing options are viable and displays one or more of the identified, viable remanufacturing options.

24. The system as set forth in claim 23 further comprising a collection system that collects the obtained data on each of the items.

25. The system as set forth in claim 24 further comprising a data determination system that determines what types of the obtained data need to be obtained, wherein at least a portion of the obtained data is obtained by researching the items and another portion of the obtained data is from evaluating each of the items.

26. The system as set forth in claim 23 further comprising a subsystem identification system that identifies one or more subsystems, wherein the functional analysis system determines a functional hierarchy and interrelation of the systems, subsystems and components, wherein the remanufacturing assessment processing system assesses a viability of a plurality of remanufacturing options for each of the items also based on the functional hierarchy and interrelation of the systems, subsystems, and components.

27. The system as set forth in claim 23 wherein the overall condition processing system further comprises a physical condition processing system that assesses one or more physical conditions for each of the items, wherein the overall condition processing system assesses the overall condition of each of the items based on the assessed physical conditions for the item.

28. The system as set forth in claim 23 wherein the operation specification processing system further comprises:
   a component function system that determines one or more component functions associated with each component; and
   a manufacturing data system that determines one or more manufacturing data for each of the components, wherein the operations specifications comprise the component functions and the manufacturing data.

29. The system as set forth in claim 28 further comprising a system function identification system that identifies one or more systems in the apparatus and identifies one or more system functions for each of the systems, wherein the operations specifications also comprise the component system functions.

30. The system as set forth in claim 23 wherein the remanufacturing options further comprise at least two or more of a modify option, a restore option, a reuse option, a replace option, and a remove option.

31. The system as set forth in claim 23 wherein the remanufacturing assessment processing system identifies which one of the plurality of remanufacturing options identified as viable is an optimal choice and outputs the identified, optimal remanufacturing option.

32. The system as set forth in claim 23 further comprising a cost data processing system that obtains cost data on each of the remanufacturing options for each of the items.

33. The system as set forth in claim 32 further comprising a remanufacturing reassessment processing system that reassesses the plurality of remanufacturing options for each of the items based on the assessing of the plurality of remanufacturing options and the obtained cost data.

34. The system as set forth in claim 23 further comprising a value analysis processing system that analyzes a value of each of the viable remanufacturing options based on two or more factors.

35. The system as set forth in claim 34 wherein at least one of the factors is a cost for each of the remanufacturing options.

36. The system as set forth in claim 34 wherein the value analysis processing system further comprises:
   a weight determination system that determines a weight for each of a plurality of measurement criteria;
   a rating system that rates each of the remanufacturing options for each of the plurality of measurement criteria; and
   a scoring system that determines a total score for each of the remanufacturing options based on the weight and the scoring, wherein an optimal one of the remanufacturing options has the highest total score.

37. The system as set forth in claim 23 further comprising an economic analysis system that analyzes an economic cost for at least one of the viable remanufacturing options.

38. The system as set forth in claim 23 wherein the remanufacturing assessment system further comprises assessing whether one of the plurality of remanufacturing options is an upgrade that replaces two or more of the items with a smaller set of items.

39. The system as set forth in claim 23 wherein at least two of the plurality of remanufacturing options are potentially viable for each of the items regardless of the condition of the items.

40. The system as set forth in claim 23 further comprising a risk priority processing system in the at least one computing device that determines a risk priority of each of the items based on the obtained data, wherein the remanufacturing assessment processing system assesses a viability of a plurality of remanufacturing options for each of the items also is based on the determined risk priority for each of the items.

41. The system as set forth in claim 40 wherein the risk priority processing system further comprises:
   a failure mode system that determines one or more failure modes for each of the items;
   a cause determining system that determines one or more causes for each of the failure modes;
   an effects determining system that determines one or more effects of each of the failure modes;
   a severity rating system that determines a severity rating for each of the effects; and
   an occurrence rating system that determines an occurrence rating for each of the effects, wherein the risk priority processing system derives the risk priority from the severity rating and the occurrence rating for each of the effects.

42. The system as set forth in claim 41 wherein the effects comprise a local effect, a secondary effect, and an ultimate effect.

43. A computer readable medium having stored thereon instructions for assessing remanufacturability of one or more items in an apparatus which when executed by at least one processor, causes the processor to perform steps comprising:
   determining an overall condition of items in an apparatus regardless of the condition of each of the items based on obtained data;
   determining whether each of the items satisfies one or more operation specifications based on the obtained data;
   identifying one or more systems in the apparatus;
   identifying components in each of the systems;
   determining a functional hierarchy and interrelation of the systems and components;
   applying a filter to the determined functional hierarchy limiting the functional hierarchy to a specified level of the functional hierarchy; and
   assessing a plurality of remanufacturing options for each of the items based on the determined overall condition of the items regardless of a condition of each of the items, the determined satisfaction of the operation specifications, the functional hierarchy and interrelation of the systems and components and the specified level of the functional hierarchy to identify which of the plurality of remanufacturing options are viable and outputting one or more of the identified, viable remanufacturing options and displaying one or more of the identified, viable remanufacturing options.

44. The medium as set forth in claim 43 further comprising collecting the obtained data on the items.

45. The medium as set forth in claim 44 wherein the obtaining data further comprises:
   obtaining at least a portion of the data from stored information on the items;
   researching the items to obtain at least a portion of the data; and examining the items to obtain at least a portion of the data.

46. The medium as set forth in claim 44 further comprising determining what types of the obtained data need to be collected.

47. The medium as set forth in claim 43 further comprising identifying one or more subsystems, wherein the determining a functional hierarchy and interrelation determines the functional hierarchy and interrelation of the systems, subsystems and components, wherein the assessing a viability of a plurality of remanufacturing options for each of the items is also based on the functional hierarchy and interrelation of the systems, subsystems, and components.

48. The medium as set forth in claim 43 wherein determining an overall condition of each of the items further comprises assessing one or more physical conditions for each of the items, wherein the overall condition of each of the items is based on the assessed physical conditions for the item.

49. The medium as set forth in claim 43 wherein the determining whether each of the items satisfies one or more operation specifications further comprises:
  determining one or more component functions associated with each component; and
  determining one or more manufacturing data for each of the components, wherein the operations specifications comprise the component functions and the manufacturing data.

50. The medium as set forth in claim 49 further comprising:
  identifying one or more systems in the apparatus, each of the systems comprising one or more of the components; and
  identifying one or more system functions for each of the systems, wherein the operations specifications also comprise the component system functions.

51. The medium as set forth in claim 49 wherein determining one or more manufacturing data for each of the components further comprises at least one of:
  obtaining at least a portion of the manufacturing data from stored information on each of the components; and
  researching each of the components to obtain at least a portion of the manufacturing data.

52. The medium as set forth in claim 43 wherein the remanufacturing options further comprise at least two or more of a modify option, a restore option, a reuse option, a replace option, and a remove option.

53. The medium as set forth in claim 43 wherein the assessing a plurality of remanufacturing options further comprises identifying which one of the plurality of remanufacturing options identified as viable is an optimal choice and the outputting further comprises outputting the identified, optimal remanufacturing option.

54. The medium as set forth in claim 43 further comprising obtaining cost data on each of the remanufacturing options for each of the items.

55. The medium as set forth in claim 54 further comprising reassessing the plurality of remanufacturing options for each of the items based on the assessing of the plurality of remanufacturing options and the obtained cost data.

56. The medium as set forth in claim 43 further comprising analyzing a value of each of the viable remanufacturing options based on two or more factors.

57. The medium as set forth in claim 56 wherein at least one of the factors is a cost for each of the remanufacturing options.

58. The medium as set forth in claim 57 wherein the analyzing further comprises:
  determining a weight for each of a plurality of measurement criteria;
  rating each of the remanufacturing options for each of the plurality of measurement criteria; and
  determining a total score for each of the remanufacturing options based on the weight and the scoring, wherein an optimal one of the remanufacturing options has the highest score.

59. The medium as set forth in claim 43 further comprising analyzing an economic cost for at least one of the viable remanufacturing options.

60. The medium as set forth in claim 43 wherein the assessing further comprises assessing whether one of the plurality of remanufacturing options is an upgrade that replaces two or more of the items with a smaller set of items.

61. The medium as set forth in claim 43 wherein at least two of the plurality of remanufacturing options are potentially viable for each of the items regardless of the condition of the items.

62. The medium as set forth in claim 43 further comprising determining a risk priority of each of the items based on the obtained data, wherein the assessing a viability of a plurality of remanufacturing options for each of the items also is based on the determined risk priority for each of the items.

63. The medium as set forth in claim 62 wherein the determining a risk priority of each of the items further comprises:
  determining one or more failure modes for each of the items;
  determining one or more causes for each of the failure modes;
  determining one or more effects of each of the failure modes;
  determining a severity rating for each of the effects; and
  determining an occurrence rating for each of the effects, wherein the risk priority is derived from the severity rating and the occurrence rating for each of the effects.

64. The medium as set forth in claim 63 wherein the effects comprise a local effect, a secondary effect, and an ultimate effect.

65. A method for assessing remanufacturability of one or more items in an apparatus, the method comprising:
  obtaining one or more assessments of the one or more items regardless of a condition of each item;
  identifying one or more systems in the apparatus;
  identifying components in each of the systems;
  determining a functional hierarchy and interrelation of the systems and components;
  applying a filter to the determined functional hierarchy limiting the functional hierarchy to a specified level of the functional hierarchy; and
  assessing in at least one processing system a plurality of remanufacturing options for each of the items regardless of the condition of each of the items based on the one or more assessments, the functional hierarchy and interrelation of the systems and components, and the specified level of the functional hierarchy to identify which of the plurality of remanufacturing options are viable and displaying one or more of the identified, viable remanufacturing options.

66. The method as set forth in claim 65 wherein the obtaining one or more assessments comprises determining an overall condition of each of the items based on obtained data.

67. The method as set forth in claim 66 wherein determining an overall condition of each of the items further comprises obtaining assessments of one or more physical conditions for each of the items, wherein the overall condition of each of the items is based on the assessed physical conditions for the item.

68. The method as set forth in claim 65 wherein the obtaining one or more assessments comprises determining whether each of the items satisfies one or more operation specifications based on obtained data.

69. The method as set forth in claim 68 wherein the determining whether each of the items satisfies one or more operation specifications further comprises:
   determining one or more item functions associated with each item; and
   determining one or more manufacturing data for each of the items, wherein the operations specifications comprise the item functions and the manufacturing data.

70. The method as set forth in claim 69 further comprising:
   identifying one or more systems in the apparatus, each of the systems comprising one or more of the components; and
   identifying one or more system functions for each of the systems, wherein the operations specifications also comprise the component system functions.

71. The method as set forth in claim 65 wherein the obtaining one or more assessments comprises determining a risk priority of each of the items based on obtained data.

72. The method as set forth in claim 71 wherein the determining a risk priority of each of the items further comprises:
   determining one or more failure modes for each of the items;
   determining one or more causes for each of the failure modes;
   determining one or more effects of each of the failure modes;
   determining a severity rating for each of the effects; and
   determining an occurrence rating for each of the effects, wherein the risk priority is derived from the severity rating and the occurrence rating for each of the effects.

73. The method as set forth in claim 72 wherein the effects comprise a local effect, a secondary effect, and an ultimate effect.

74. The method as set forth in claim 65 further comprising identifying one or more subsystems, wherein the determining a functional hierarchy and interrelation determines the functional hierarchy and interrelation of the systems, subsystems and components, wherein the assessing a viability of a plurality of remanufacturing options for each of the items is also based on the functional hierarchy and interrelation of the systems, subsystems, and components.

75. The method as set forth in claim 65 wherein the remanufacturing options further comprise at least two or more of a modify option, a restore option, a reuse option, a replace option, and a remove option.

76. The method as set forth in claim 65 wherein the assessing a plurality of remanufacturing options further comprises identifying which one of the plurality of remanufacturing options identified as viable is an optimal choice.

77. The method as set forth in claim 65 wherein at least two of the plurality of remanufacturing options are potentially viable for each of the items regardless of the condition of the items.

78. A system for assessing remanufacturability of one or more items in an apparatus, the system comprising:
   an item assessment processing system in at least one computing device that obtains one or more assessments of the one or more items regardless of a condition of each item;
   an identification system that identifies one or more systems in the apparatus and components in each of the systems;
   a functional analysis system that determines a functional hierarchy and interrelation of the systems and components;
   a filtering system that applies a filter to the determined functional hierarchy limiting the functional hierarchy to a specified level of the functional hierarchy; and
   a remanufacturing assessment processing system in the at least one computing device that assesses a plurality of remanufacturing options for each of the items regardless of the condition of each of the items based on the obtained one or more assessments, the functional hierarchy and interrelation of the systems and components, and the specified level of the functional hierarchy to identify which of the plurality of remanufacturing options are viable and displaying one or more of the identified, viable remanufacturing options.

79. The system as set forth in claim 78 wherein the item assessment processing system determines an overall condition of each of the items based on obtained data.

80. The system as set forth in claim 79 wherein the item assessment processing system assesses one or more physical conditions for each of the items, wherein the overall condition of each of the items is based on the assessed physical conditions for the item.

81. The system as set forth in claim 78 wherein the item assessment processing system determines whether each of the items satisfies one or more operation specifications based on obtained data.

82. The system as set forth in claim 81 wherein the item assessment processing system further comprises:
   a function processing system that determines one or more item functions associated with each component; and
   a manufacturing data processing system that determines one or more manufacturing standards for each of the items, wherein the operations specifications comprise the item functions and manufacturing data.

83. The system as set forth in claim 78 further comprising an identification system that identifies one or more systems in the apparatus and one or more system functions for each of the systems, wherein the operations specifications also comprise the component system functions.

84. The system as set forth in claim 78 wherein the item assessment processing system determines a risk priority of each of the items based on obtained data.

85. The system as set forth in claim 84 wherein the item assessment processing system further comprises:
   a failure mode system that determines one or more failure modes for each of the items;
   a cause determination system that determines one or more causes for each of the failure modes;
   an effects determination system that determines one or more effects of each of the failure modes;
   a severity rating system that determines a severity rating for each of the effects; and
   an occurrence rating system that determines an occurrence rating for each of the effects, wherein the item assessment processing system derives the risk priority from the severity rating and the occurrence rating for each of the effects.

86. The system as set forth in claim 85 wherein the effects comprise a local effect, a secondary effect, and an ultimate effect.

87. The system as set forth in claim 78 wherein the identification system identifies one or more subsystems, wherein the functional analysis system determines a functional hierarchy and interrelation determines the functional hierarchy and interrelation of the systems, subsystems and components, wherein the item assessment processing system assesses a viability of a plurality of remanufacturing options for each of the items also based on the functional hierarchy and interrelation of the systems, subsystems, and components.

88. The system as set forth in claim 78 wherein the remanufacturing options further comprise at least two or more of a modify option, a restore option, a reuse option, a replace option, and a remove option.

89. The system as set forth in claim 78 wherein the item assessment processing system identifies which one of the plurality of remanufacturing options identified as viable is an optimal choice.

90. The system as set forth in claim 78 wherein at least two of the plurality of remanufacturing options are potentially viable for each of the items regardless of the condition of the items.

91. A computer readable medium having stored thereon instructions for assessing remanufacturability of one or more items in an apparatus which when executed by at least one processor, causes the processor to perform steps comprising:
   obtaining one or more assessments of the one or more items regardless of a condition of each item;
   identifying one or more systems in the apparatus;
   identifying components in each of the systems;
   determining a functional hierarchy and interrelation of the systems and components;
   applying a filter to the determined functional hierarchy limiting the functional hierarchy to a specified level of the functional hierarchy; and
   assessing a plurality of remanufacturing options for each of the items regardless of the condition of each of the items based on the one or more assessments, the functional hierarchy and interrelation of the systems and components, and the specified level of the functional hierarchy to identify which of the plurality of remanufacturing options are viable and displaying one or more of the identified, viable remanufacturing options.

92. The medium as set forth in claim 91 wherein the obtaining one or more assessments comprises determining an overall condition of each of the items based on obtained data.

93. The medium as set forth in claim 92 wherein determining an overall condition of each of the items farther comprises obtaining assessments of one or more physical conditions for each of the items, wherein the overall condition of each of the items is based on the assessed physical conditions for the item.

94. The medium as set forth in claim 91 wherein the obtaining one or more assessments comprises determining whether each of the items satisfies one or more operation specifications based on the obtained data.

95. The medium as set forth in claim 94 wherein the determining whether each of the items satisfies one or more operation specifications further comprises:
   determining one or more item functions associated with each item; and
   determining manufacturing data for each of the items, wherein the operations specifications comprise the item functions and the manufacturing data.

96. The medium as set forth in claim 94 further comprising:
   identifying one or more systems in the apparatus, each of the systems comprising one or more of the components; and
   identifying one or more system functions for each of the systems, wherein the operations specifications also comprise the component system functions.

97. The medium as set forth in claim 91 wherein the obtaining one or more assessments comprises determining a risk priority of each of the items based on obtained data.

98. The medium as set forth in claim 97 wherein the determining a risk priority of each of the items further comprises:
   determining one or more failure modes for each of the items;
   determining one or more causes for each of the failure modes;
   determining one or more effects of each of the failure modes;
   determining a severity rating for each of the effects; and
   determining an occurrence rating for each of the effects, wherein the risk priority is derived from the severity rating and the occurrence rating for each of the effects.

99. The medium as set forth in claim 98 wherein the effects comprise a local effect, a secondary effect, and an ultimate effect.

100. The medium as set forth in claim 91 further comprising identifying one or more subsystems, wherein the determining a functional hierarchy and interrelation determines the functional hierarchy and interrelation of the systems, subsystems and components, wherein the assessing a viability of a plurality of remanufacturing options for each of the items is also based on the functional hierarchy and interrelation of the systems, subsystems, and components.

101. The medium as set forth in claim 91 wherein the remanufacturing options farther comprise at least two or more of a modify option, a restore option, a reuse option, a replace option, and a remove option.

102. The medium as set forth in claim 91 wherein the assessing a plurality of remanufacturing options further comprises identifying which one of the plurality of remanufacturing options identified as viable is an optimal choice.

103. The medium as set forth in claim 91 wherein at least two of the plurality of remanufacturing options are potentially viable for each of the items regardless of the condition of the items.

* * * * *